US006696974B1

United States Patent
Mathis

(10) Patent No.: US 6,696,974 B1
(45) Date of Patent: Feb. 24, 2004

(54) CABLE DEVICE FOR DETECTING AND MONITORING ROCK AND SOIL DISPLACEMENT

(76) Inventor: James I. Mathis, 110 S. Lookout Mtn. Dr., Ellensburg, WA (US) 98926

( * ) Notice: Subject to any disclaimer, the term of this patent is extended or adjusted under 35 U.S.C. 154(b) by 388 days.

(21) Appl. No.: 09/627,687

(22) Filed: Jul. 28, 2000

(51) Int. Cl.[7] ............................................. G01V 3/00
(52) U.S. Cl. ........................ 340/854.7; 340/870.31; 324/534; 324/535
(58) Field of Search .................. 340/854.7, 870.31; 324/534, 535

(56) References Cited

U.S. PATENT DOCUMENTS

| | | | | |
|---|---|---|---|---|
| 6,084,393 A | * | 7/2000 | Yankielun | 324/72.5 |
| 6,114,857 A | * | 9/2000 | Kohl | 324/534 |
| 6,313,645 B1 | * | 11/2001 | Brandelik et al. | 324/664 |
| 6,526,189 B1 | * | 2/2003 | Yankielun | 324/534 |

* cited by examiner

Primary Examiner—Timothy Edwards
(74) Attorney, Agent, or Firm—Law Office of Marc D. Machtinger, Ltd.

(57) ABSTRACT

A cable composed of material capable of conducting light, sound, or electricity is inserted by appropriate means into a material to be examined. A portion of said cable having predetermined parameters is fixed internally within the material. The cable is equipped with anchors that restrict movement within the material to be examined. Displacement or deformation of the material to be examined results in displacement and deformation of the sensor cable system. The anchors preferably concentrate stress or deformation at specific points of the cable as the cable deforms. The anchors may also allow movement of the cable such that displacement and deformation of the cable within the material is reduced. Monitoring is conducted by attaching an appropriate test instrument to said cable that utilizes time domain reflectometry techniques appropriate to the material composition and characteristics of the cable which may be optical time domain reflectometry (OTDR), electrical time domain reflectometry (TDR) or sound time domain reflectometry (SONAR). Said principles of examination or monitoring of the cable determine location and magnitude of displacement and deformation of the cable within the material to be examined.

39 Claims, 13 Drawing Sheets

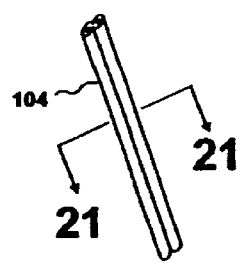
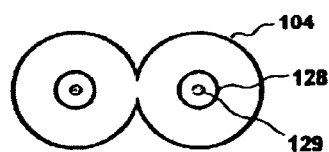
FIG. 20  FIG. 21
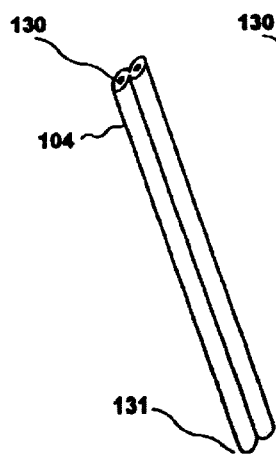
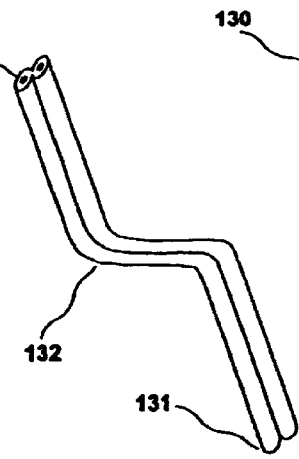
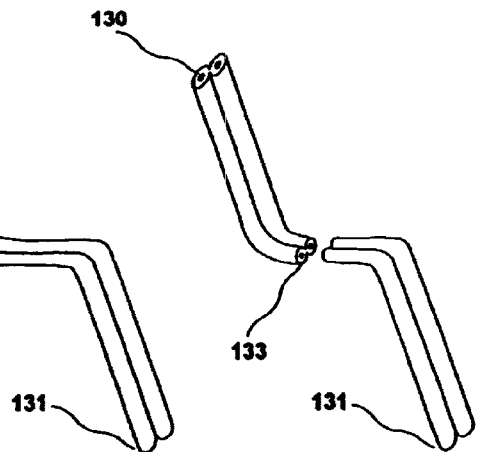
FIG. 22  FIG. 23  FIG. 24

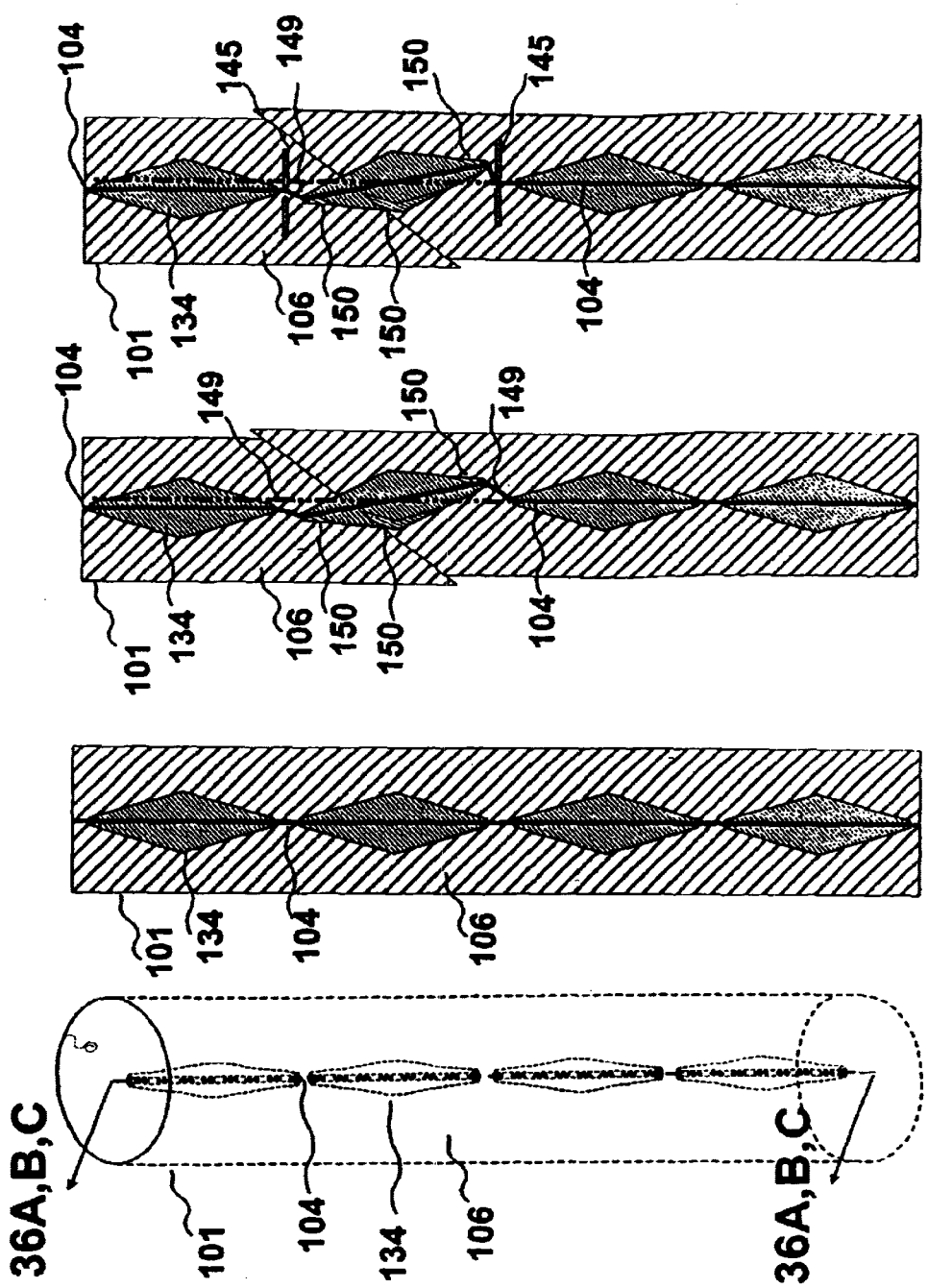

CABLE DEVICE FOR DETECTING AND MONITORING ROCK AND SOIL DISPLACEMENT

FIELD OF INVENTION

This invention relates to the improvement of event detection capabilities for cable monitoring devices utilizing time domain reflectometry principles as installed in geotechnical materials.

BACKGROUND

Time Domain Reflectometry, or TDR, is a remote sensing electrical measurement technique that has been used for many years to determine the spatial location and nature of various objects. An early form of TDR, dating from the 1930s, that most people are familiar with is radar. The type of TDR most commonly referred to by the acronym in the industry is coaxial TDR. Coaxial TDR is essentially a "closed circuit radar". It involves sending an electrical pulse along a coaxial cable and using an oscilloscope to observe the echoes returning back to the input. This technique was reported in the literature in the 1930's and 40's for testing telephone coaxial cables. Numerous TDR articles and books have been written on the subject since.

Optical TDR functions by sending a light pulse down a fiber optic cable. This pulse is reflected by broken ends or attenuated by cable bends. Sonar, also a type of TDR, operates by pulsing a sound wave through a media and examining the returned echo for reflection and attenuation compared to the original signal.

TDR has been actively investigated by both government and private enterprise for uses in monitoring mining induced displacements in the geologic mass surrounding the mine. U.S. Bureau of Mine research was started in the 1960's, when TDR was primarily used to locate breaks in electrical power cables. Since then, use of the method has expanded, but has still not reached its full potential in the field.

If a geologic material is subject to excess stress, whether generated by natural events (excess rainfall, earthquakes, etc.), or by human events (excavation) it displaces to equilibrate this excess stress. This will result in discrete displacement (failure along a plane) or distributed displacement within the geologic mass. TDR cable monitoring is generally conducted by placing a TDR capable cable in a drill hole in the geologic mass. Prior to installation, the cable may be crimped to provide reference reflections in the cable at known physical locations in the rock mass. After crimping, the cable is inserted into a borehole, and bonded to the surrounding rock with a cement grout. At locations where progressive geologic movement is sufficient to fracture the grout, cable deformation occurs that can be monitored with a TDR cable tester.

This technique has been tested at Syncrude in Canada, amongst other locations. Syncrude operates an oil sand mine in northern Alberta, Canada. The oil sand is mined by large draglines, which operate adjacent to the edge of a highwall that varies in height from 40 to 60 m. Coaxial cables were installed in vertical holes at three highwall locations in the immediate vicinity (less than 10 m) of slope inclinometers so that a comparison could be made between the two types of instrumentation. The objective of these installations was to assess the ease or difficulty of installation, suitability to field conditions, ease or difficulty of data acquisition, comparison with existing monitoring procedures, and sensitivity of TDR to slope movements.

In addition to the field study, an extensive laboratory test program was implemented to correlate TDR reflection magnitude with shear deformation of grouted cables.

It was concluded that TDR represented a promising technology for slope monitoring, but modifications would be required to increase its sensitivity in oil sands and stiff clay soils. Applications in hard rock mining, such as block caving, indicate that block displacement is sufficiently discrete to shear the cable at distinct points, giving a better response than would be expected in stiff clays. In addition, proper selection of the type of cable to be encapsulated, as well as the encapsulation material, such as stiffer grout, can be utilized to increase the system sensitivity to displacement.

It is further known that "crimps" or buttons can be placed on the monitoring cable prior to installation. These impart a manufactured defect in the cable that serves as a reference point for any adjacent TDR reflections. These crimps are not anchors and serve exclusively as reference points for TDR measurement.

In addition, the art in the field of TDR geotechnical monitoring has become almost exclusively focused on the magnitude and type of displacement within the geologic material being monitored. The invention described herein focuses, alternatively, on maximizing the probability of detecting any significant displacement within the geologic material. While the former may be of significance for exact definition of a known feature, or precisely determining the type of failure that may be occurring, within the geologic medium, it lacks sensitivity regarding the specific questions "Is displacement occurring in the geologic material being monitored?" and "If so, where, approximately, is the displacement occurring?" These two questions are of utmost criticality in determining further action and monitoring in any geotechnical monitoring situation. If a slope containing a gas pipeline is failing, a simple, effective monitoring system should indicate immediately that action is required based on the fact that some event is occurring in the geologic material composing the slope, a fact that the proposed invention capitalizes on. The invention proposed herein increases the sensitivity of the geotechnical monitoring system such that it can answer such questions quickly, with more sensitivity, more inexpensively, and with less technical input than the monitoring systems utilized to date.

Little attempt has been made to address the shortcomings of TDR applications mentioned above from the Syncrude report, i.e. modifications are necessary to increase TDR sensitivity in oil sands (sands) and stiff clay soils. The response has generally been to install more sensitive cables utilizing the same old techniques. Thus, TDR monitoring is under-utilized in areas composed of such materials.

The prior art, in terms of sensor cables and cable anchor devices, suffers from a number of flaws:

(a) anchor devices for cables of the prior art are designed for attaching cables to a surface for transmission purposes. As such they are not designed for, and are not applicable, to restricting cable motion in a three-dimensional solid for monitoring purposes.

(b) anchor devices for cables of the prior art are not designed for being encapsulated in a surrounding media such as grout, which is a requirement for geotechnical monitoring.

(c) anchor devices for cables of the prior art are not designed to function in terms of displacement amplification at the end of oblong anchors due to rotation about the anchor's centroid.

(d) with minor exception, the concept of an anchor system being attached to a sensor cable for point strain monitoring, event detection, or continuous strain monitors has been totally ignored.

(e) prior art anchor devices are all too expensive and unnecessarily cumbersome for geotechnical use in light of the number of such devices required for a single sensor cable installation.

(f) most of the existing sensor cable arrangements attempt to quantify the magnitude of displacement between two pre-determined, fixed points along the sensor cable length. This would be unrealistic for geotechnical monitoring as the actual location of a failure surface, i.e., a point to be monitored, is unknown upon installation of the sensor in undisturbed material. For initial analysis, it is the occurrence and approximate location of the failure (deformation) that is critical to the success of geotechnical monitoring, not the absolute deformation magnitude.

(g) the sensor cable devices of the prior art require a specific loading mode. This is generally induced by tension or compression (buckling). Such limitations are too constraining and unnecessary for an event detecting geotechnical monitoring system. If such absolute constraints are placed on a geotechnical monitoring system it would be extremely difficult to utilize given the complete range and combination of tension, compression, and shear found in any loading situation within a three-dimensional solid.

(i) most of the existing sensor cables seek to obtain a highly reproducible loss within the cable as a function of deformation. This is a limiting factor for geotechnical event detection. Any change within the properties of the sensor cable indicates motion of the surrounding medium and is to be detected and observed. So long as the change is detectable and provides an indication of displacement within the monitored material, the magnitude of the change is relatively unimportant.

The prior art event detectors are also limited by surficial applications, being applied to the surface of a structure in order to detect a specific physical happening. This is of little practicality for a geologic event that will occur somewhere three-dimensionally within a geologic medium. These prior art devices make no mention of an encapsulating media. As event detectors, the prior art utilizes an interlocking tooth arrangement to create microbends in a fiber optic cable if a specific "event" occurs. This does not amplify displacement detected in a surrounding geologic environment. Nor is it particularly sensitive to omni-directional motion, being more specifically designed for motion oriented from a specific direction.

Thus, objects of the present invention are:

(a) to provide a sensor cable composed of material capable of conducting light, sound, or electricity to be inserted by appropriate means into a material to be examined, allowing selection of the most appropriate TDR method (optical, coaxial, sonar, or other) for the specific mode of deformation expected within the geologic mass;

(b) to provide a sensor cable installed three-dimensionally and internally within the body to be examined;

(c) to provide a cable anchor that restricts longitudinal movement of the cable within the encapsulating medium, whether it be soil, grout, chemical or other agent;

(d) to provide a cable anchor that, when displaced, acts as a displacement amplifier, undergoing translation/rotation within the encapsulating agent);

(e) to provide a cable anchor sufficiently rigid and strong such as to promote bearing failure in the encapsulating material upon translation/rotation by geologic material displacement, if such behavior is desired;

(f) to provide a cable anchor that can be engineered as to length, shape, and material properties such as to specifically determine at what loads and deflections bearing failure will take place in the encapsulating medium as a function of cable anchor rotation;

(g) to provide a monitoring system such that sensor cable strength and modulus can be chosen such as to impact on the relative motion of the adjacent cable anchors;

(h) to provide a monitoring system such that the material properties of the of the encapsulating agent may be chosen such as to determine the stress levels of bearing failure around the cable anchor upon geologic material displacement;

(i) to provide a geotechnical monitoring system that may be installed without a borehole in a geologic mass, but instead be inserted in the mass by utilization of fluid jet action;

(j) to provide a geotechnical monitoring device utilizing TDR principles functioning as an event detector independent of the shape the cable assumes upon deformation of both itself and surrounding media;

(k) to provide a geotechnical monitoring device utilizing TDR principles functioning as an event detector independent of the stress type (shear, tensile, or compression) the sensing cable experiences during deformation of both itself and surrounding media;

(l) to provide a geotechnical monitoring device capable of event detection along its design encapsulated length such that deformation in the surrounding geologic medium may be located proximal to the cable disturbance between anchors;

(m) to provide access through an actively failing and displacing geologic body such that a sensor cable can be placed and utilized for monitoring at and below the assumed failure mass's base plane;

(n) to substantially improve detection capability for cable based TDR systems in soils and weak geologic rock formations; and (o) to provide improved performance for cable based TDR systems in hard rock environments as a function of anchor, encapsulating agent, and cable selection.

Further, the proposed invention will improve upon present TDR techniques, utilizing increasing cable sensitivity by amplifying displacement within the geologic mass. Thus, if very sensitive instruments and cables, as presently used, were equipped in accordance with the proposed invention, their detection capacity would be substantially enhanced. The user then has a choice of using substantially less expensive equipment and material to obtain similar quality data to that presently attainable due to the increased sensitivity of the system, or maintaining the cost of the system and increasing the detection capabilities substantially by usage of this proposed invention.

SUMMARY OF THE INVENTION

The invention is a sensor cable system for time domain reflectometry measurement of displacement in a geotechnical material comprising a sensor cable and an anchor attached to the cable, wherein the anchor is configured to be secured within the geotechnical material. Preferably, the sensor cable system comprises a plurality of anchors.

Alternatively, the anchor can extend along a substantial portion of the cable and have one or more induced weak points. In embodiments employing a plurality of individual anchors, the anchors are preferably shaped and/or joined with breakable connectors. The induced weak points, shaped anchors and breakable connectors amplify a time domain reflectometry signal caused by displacement of the geotechnical material compared to a signal the displacement would generate in the sensor cable alone. The sensor cable may also comprise a cable motion restrictor, or one or more of the anchors may be configured to comprise a cable motion restrictor. The use of a cable motion restrictor increases the signal generated by displacement of the geotechnical material. The systems are configured to be disposed within a borehole in the geotechnical material and the anchors grouted or otherwise secured within the geotechnical material.

In these systems, the sensor cable may further comprise a TDR signal attenuator. In some embodiments, it may be desirable to configure the anchors so that, when attached to the sensor cable, a TDR response is returned.

The systems of the invention may be configured for use with optical time domain reflectometry (OTDR), electrical time domain reflectometry (TDR) or sound time domain reflectometry (SONAR) techniques and monitors.

The invention also comprises methods of detecting displacement within a geotechnical material which generally comprise the steps of creating a borehole in the geotechnical material, providing a sensor cable system comprising a sensor cable and an anchor attached to the cable, wherein the anchor is configured to be secured within the geotechnical material, disposing the sensor cable within the borehole, depositing grout, or otherwise encapsulating the cable within the borehole to secure the anchor, performing time domain reflectometry to monitor displacement within the geotechnical material.

The proposed system substantially improves detection capability for cable based TDR systems in soils and weak geologic rock formations as well as providing improved performance for cable based TDR systems in hard rock environments due to its unique features and composition.

BRIEF DESCRIPTION OF THE DRAWINGS

In the drawings, closely related figures may have the same number but different alphabetical suffixes.

FIG. 20 depicts a typical length of zip cord type fiber optic riser cable for use with the invention.

FIG. 21 depicts a diametrical section through FIG. 20.

FIG. 22 shows an isometric view of a fiber optic riser cable, depicting the end towards and away from an OTDR read instrument.

FIG. 23 illustrates a bend in a fiber optic riser cable.

FIG. 24 illustrates a break in a fiber optic riser cable due to excess strain or shears.

FIGS. 36 to 36C illustrate the amplifying effect of a shaped anchor on a sensor cable of the invention, grout crushing due to anchor rotation, and the effects of a cable motion restrictor given discrete (shear plane) displacement within a surrounding geologic host.

DETAILED DESCRIPTION OF THE INVENTION

Typical embodiments for a cable device system for detecting and monitoring displacements in rock and soil are presented herein.

Figure 1:
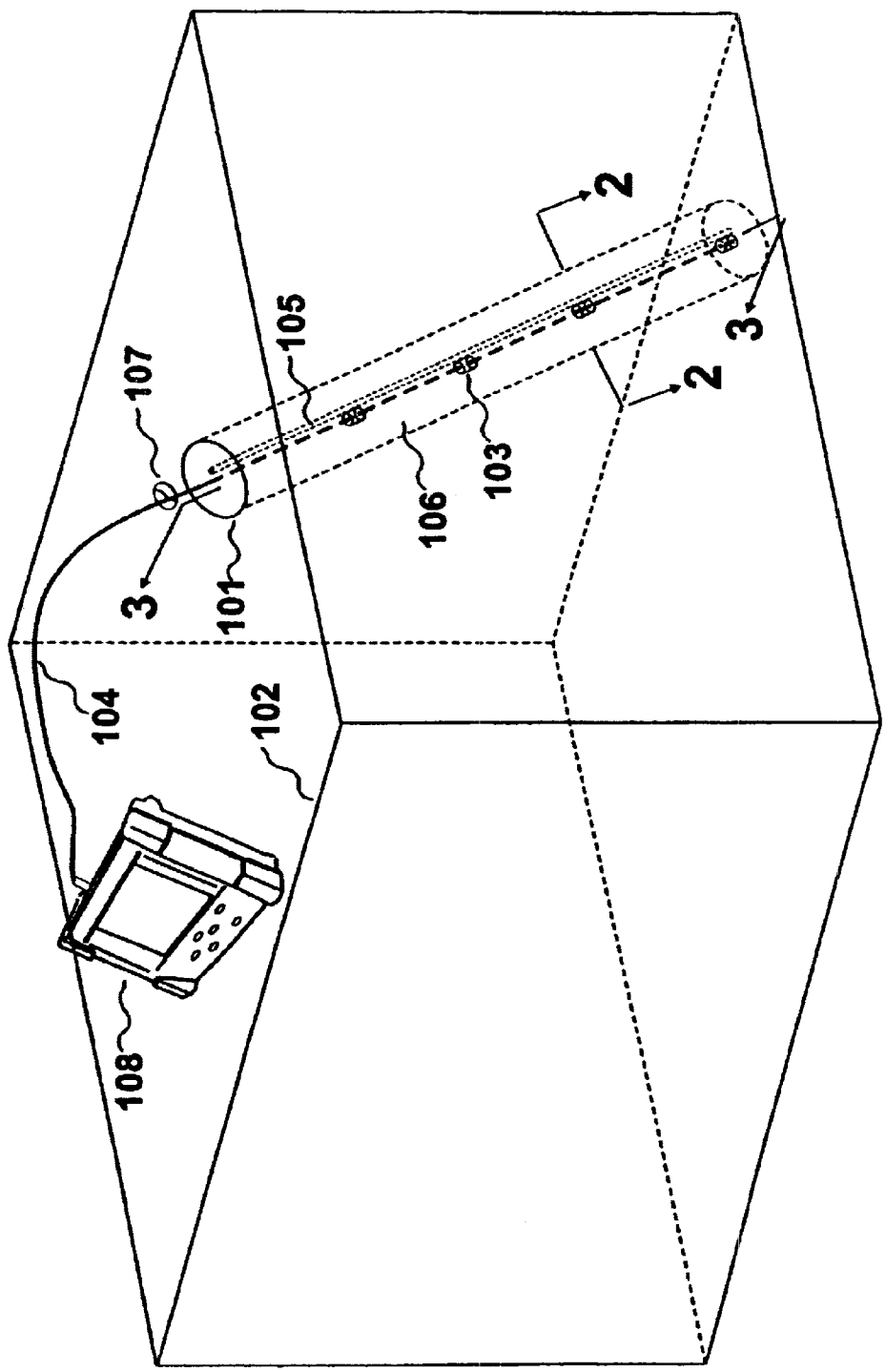
FIG. 1 shows the general configuration of the installed monitoring cable monitoring system of the invention with distributed anchors attached to the sensor cable and installed in the geologic material.
Figure 2:
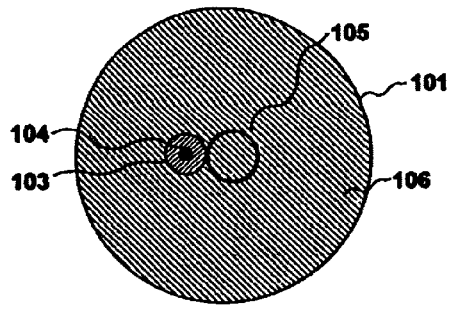
FIG. 2 shows a cross section diametrically across the borehole as depicted in FIG. 1.
Figure 3:
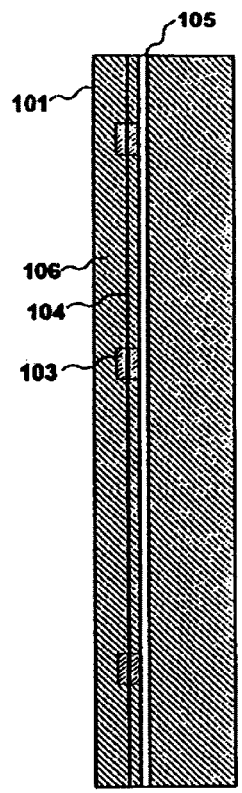
FIG. 3 shows a cross section axially across the borehole as depicted in FIG. 1.

A preferred embodiment of the device for detecting the location of displacement in stiff, strong material (rock and strong soils) utilizing fiber optic cable with optical time domain reflectometry is shown as a perspective drawing in FIG. 1 as well as a down borehole section, FIG. 2, and cross borehole section, FIG. 3.

A borehole 101 is provided in an undisturbed or slowly displacing rock or soil mass 102 by use of standard drilling techniques.

A sensor cable 104, in this case being of fiber optic composition, is placed within borehole 101. The sensor cable 104 may be single or multistrand, in any available sheathing configurations (loose buffered, tight packed, or unsheathed), and of any diameter and mode of transmission (single mode, multimode, etc.). Although any fiber optical transmission cable may be utilized, the preferred configuration utilizes Commscope optical cable, fiber optic riser, 8.3/125 single mode, 2 fiber, 2.9 mm fiber optic cable, PVC jacketed, terminated on the one end to be connected to the OTDR measuring instrument 108 with an FC/PC fiber optic connector. The end of the sensor cable 104 that is to be at the base of borehole 101 is left unterminated. Preferably, a minimum length of eighty feet of sensor cable 104 is utilized between the instrument 108 and the collar of the borehole. This length of cable, here called the launch length, allows for a stable signal to be developed within the fiber and reduces instrument effects on the return signal. Kinks, bends, and connections within the launch length should be avoided unless specifically included. The launch length of sensor cable 104 should be carefully laid out on the ground in a continuous length such as to avoid kinks and bends, or stored on a large diameter reel such that bend effects are not noted.

Figure 4:
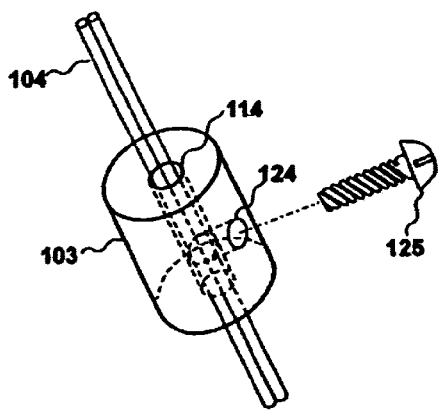
FIG. 4 depicts a method of the invention of inducing a detectable bend in the sensor cable through mechanical modification of the cable anchor.

The sensor cable 104 is to be modified by attachment of an anchorage sleeve 103. An anchorage sleeve 103 is attached to the portion of the sensor cable 104 that will be inserted and encapsulated in the borehole. Although an anchorage sleeve 103 can be of any shape (square, cylindrical, spheroidal, etc.), it should be composed of a rigid, semi-rigid, or plastic material, and physically attached to the sensor cable 104 (crimp; glue, heat shrink, welding, incorporation in fiber jacket, etc.) The preferred configuration of the anchorage sleeve 103 is a clear PVC cylinder of about 1 inch diameter and about 2 inch length, FIG. 4. A hole is drilled axially along the long axis of the PVC cylinder of sufficient diameter to encompass the sensor cable 104. This becomes the sensor cable channel 114. A cross axis hole 124 is drilled at right angles to the axis of the cylinder such as to intersect the axial hole. A sensor cable 104 is inserted through the sleeve. Standard or clear PVC adhesive is then injected with a syringe through the cross axis hole 124 in the sleeve. The clear nature of the sleeve allows observation of the injected adhesive to insure complete encapsulation of the sensor cable 104. Spacing of the anchorage sleeves 103 is dependent upon the nature of the installation. Only a single anchorage sleeve 103 may be required at the downhole end of the sensor cable 104 for specific applications (short holes, very adhesive grout or sensor cable jacket, or attempts to obtain additional use from poor-boy or kinkmeter type slope monitoring systems). Multiple anchorage sleeves 103 may be used to the point where the spacing between anchorage sleeves is near zero, i.e. the anchorage sleeves 103 are essentially in contact, such that only discrete points at anchorage sleeve 103 interfaces (ends) will promote displacement of the cable. The length of the anchorage sleeve 103 may be increased such as to amplify gradational displacement of the rock/soil mass at the ends of the anchorage sleeve 103, producing a stronger TDR or OTDR signal. A completely encapsulated system is shown and discussed in FIG. 7. The preferred anchor spacing configuration for rock is about 36 inches on center. In a preferred embodiment, the sensor cable 104 has a diameter about 10% of the distance between the anchors 103.

Physical impingement upon the sensor cable 104 can be affected by the addition of a disk, slot, hole, or other modification to the material composing the anchorage sleeve, or by offset of the hole forming the sensor cable channel. Such impingement may be desired to provide additional anchorage between a sensor cable 104 insulation jacket and the internal fibers to retard axial slippage, or to provide a physical contact which will impact on the transmission of the light signal down the sensor cable 104. This latter could be utilized as a marker location for relative distance measurement of the returned light signal. The preferred method, if such impingement is required, is to overdrill the depth of the cross axis hole 124 beyond the sensor cable channel 114. The cross axis hole should be the same diameter, or slightly larger, than the greatest width dimension of sensor cable 104. A self tapping screw 125 of the appropriate diameter to fit the cross axis hole 124 is then threaded into the cross axis hole 124. When the self tapping screw 125 is seated, it will displace the sensor cable 104 out of the sensor cable channel 114 and into the continuation of the cross axis hole 124 on the opposing side of the sensor cable channel 114, resulting in a local U-bend of the sensor cable. The magnitude and shape of this U-bend is a function of the screw diameter, depth of screw seating, and the distance beyond the sensor cable channel 114 that the cross axis hole 124 is drilled.

After all the anchorage sleeves 103 for the specific sensor cable 104 have been affixed, the machine is attached to an OTDR test instrument 108 and a test run to provide a baseline for subsequent measurements is performed. The sensor cable 104 is attached to the optical time domain reflectometry (OTDR) test instrument 108 at the appropriate port for the type of cable utilized (multimode, single mode, etc.). All calibrations must be set appropriately on the OTDR test instrument (length of cable, fiber index of refraction, scatter coefficient, pulse length, test wavelength, etc.). Although any OTDR test instrument may be utilized, the preferred configuration which provided good results utilized the Wavetek MTS 5100 with an OTDR 5026 SR (short range, single mode), 1310/1550 nm selectable, laser module. Testing was conducted at 1550 nm, single mode, and manual setup. The index of refraction was 1.4732, scatter coefficient was −79. Pulse length was 10 ns, range was 6000 ft. (6 kft), resolution was 0.25 ft., and acquisition time was 4:00 minutes. Splice threshold was set to all, reflection threshold set to all, slope threshold set to >0.10 db/km, fiber end threshold set to auto, display ghosts set to yes, slope method set to linear, launch cable set to no, results on trace set to all, remarks in table set to no.

The sensor cable 104 with the attached anchorage sleeves 103 is inserted into the borehole 101. This can be conducted by attaching this assemblage to any rigid or flexible member of a composition that will allow insertion of the assemblage into borehole 101. The preferred configuration is to attach sensor cable 104 and anchorage sleeves 103 to, and paralleling, grout tube 105, FIG. 2 and FIG. 3. Electrical tape, glass fiber tape, or other waterproof high strength tape, mechanical bands, or adhesives can be utilized to attach each anchorage sleeve 103 to the grout tube 105. A grout tube 105 is preferably a commercial grout tube available for grouting cable bolts, but can be constructed from 1 inch schedule 40 PVC pipe with adequately connected couplings for moderate hole depths. Alternatively, the grout tube 105 can be utilized as an air bleeder line for upwards oriented holes, with grout 106 being introduced at the borehole collar. After insertion in the hole, sensor cable 104 should be OTDR tested and compared to the baseline test.

Grout 106 is then placed into the borehole 101. Grout 106 may be of any composition, including cementatious products, plastic resins, foam products, soil, sand, gravel, or simply collapse of material in which the borehole is drilled. The purpose is to completely fill the hole and encapsulate the sensor cable 104 and anchorage sleeves 103. This provides improved coupling between rock/soil displacement and sensor cable 104. The preferred grout 106 for rock is composed of standard Portland cement mixed with water utilizing a water/cement ratio of 0.30–0.40/1. Alternatively, the borehole 101 can be left open, with no grout encapsulation, although this will reduce system response times and may provide erroneous data. If a pumpable grout is utilized, it should be placed until the material completely fills the hole and is extruded from the borehole 101 collar. After grout emplacement, the sensor cable 104 should be OTDR tested and compared to the baseline test.

Figure 5:
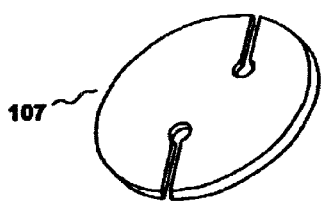
FIG. 5 depicts a device of the invention for imparting a detectable deflection of the sensor cable for exposed sensor cable.
Figure 6:
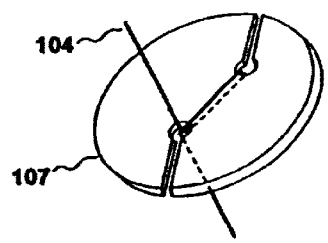
FIG. 6 shows how the sensor cable is placed around the device shown in FIG. 5 such that a detectable bend will be formed.

A fixed, predetermined location for light loss or attenuation can be induced within the sensor cable 104. This is done utilizing any means of sharply beading the cable or placing a commercial attenuator in the sensor cable 104. The preferred method is to take a single wrap of the sensor cable 104 around a small diameter object. This provides a sharp induced bend in the sensor cable 104 resulting in a detectable loss of laser light within the glass or plastic fiber 129. A physical light attenuator 107 constructed of a disk with two slotted holes, FIG. 5. and FIG. 6 will result in detectable light loss within the sensor cable 104. This physical attenuator 107 may be constructed of an approximately 1 inch diameter disk about ¼ inch thick, of any rigid or plastic material with two holes cable of accepting the sensor cable 104 in a looped configuration, FIG. 6. The physical attenuator 107 is then placed on the sensor cable 107 at the borehole 101 collar to provide a relative inflection mark on all further test traces. Attenuators can be placed downhole as well, if required, but will result in a loss of resolution the length of the instrument dead zone immediately beyond the attenuator. After attachment of the physical attenuator 107, the sensor cable 104 should be OTDR tested and compared to the baseline test. This test becomes the next baseline for all further rock/soil displacement monitoring on this cable.

The OTDR system for detecting the location of displacement in stiff, strong material (rock and strong soils) is then ready for use. Monitoring can be conducted on a discrete basis by attaching and testing the fiber cable 104 at predetermined or random time intervals. Alternatively, multiple sensor cable 104 assemblages can be patched through a switching system enabling continuous remote monitoring of a collection of the above monitoring devices.

Alternatively, one of skill in the art can configure the system for detecting the location of displacement in stiff, strong material (rock and strong soils) with TDR (time domain reflectometry) system. For example, sensor cable 104 may comprise Belden model 8214 coaxial cable functioning and a coaxial BNC connector replaces the FC/PC fiber optic connector, and a Tektronix Cablescout TV220 TDR test unit replaces the Wavetek MTS 5100 OTDR test instrument 108. The launch length of cable can be reduced to about 5 ft. or less.

Figure 7:
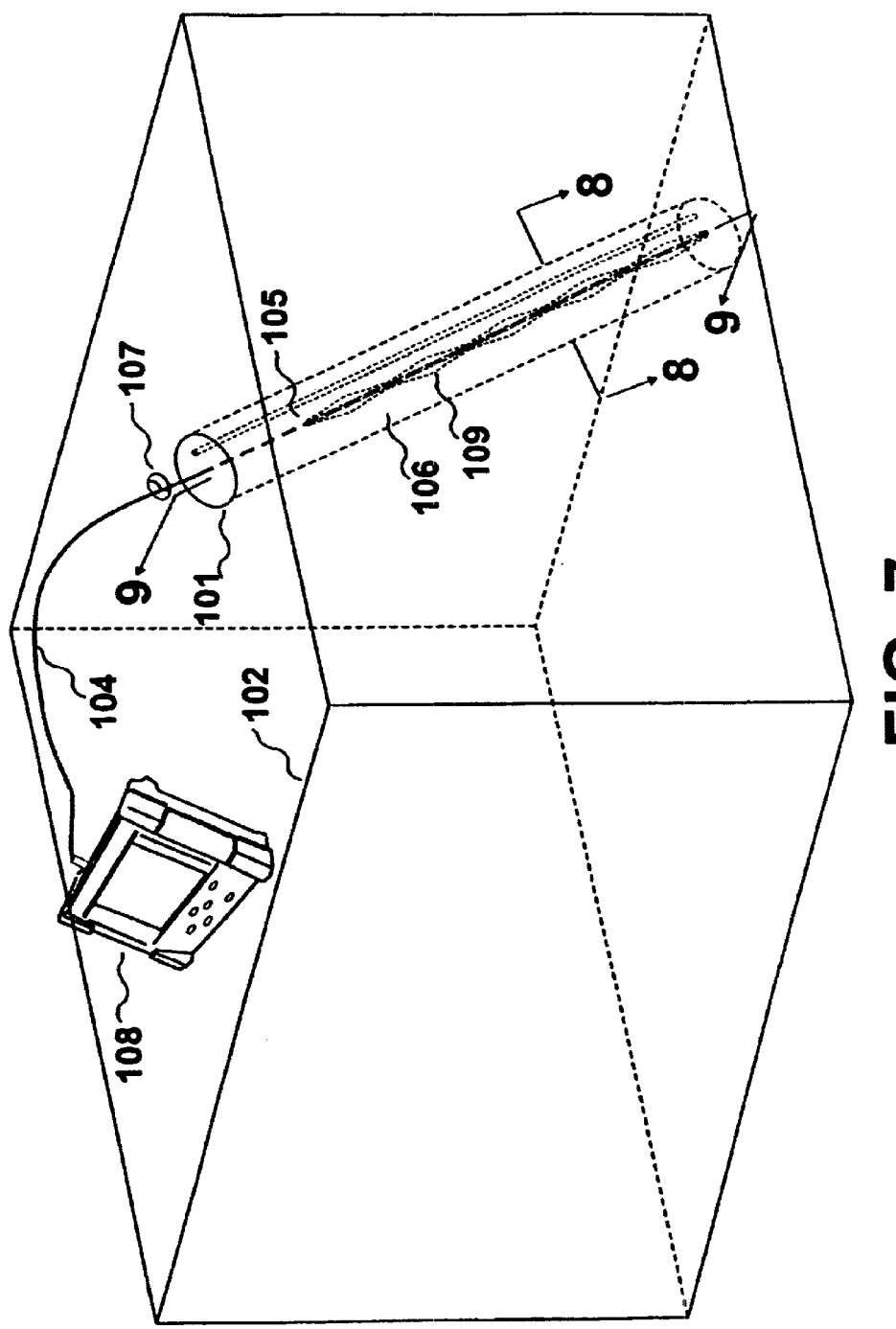
FIG. 7 shows the general configuration of the installed monitoring cable monitoring system of the invention with connected anchors or composite anchor system attached to the sensor cable and installed in the geologic material.
Figure 8:
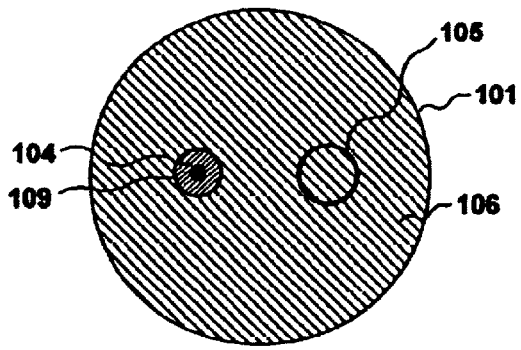
FIG. 8 shows a cross section diametrically across the borehole as depicted in FIG. 7.
Figure 9:
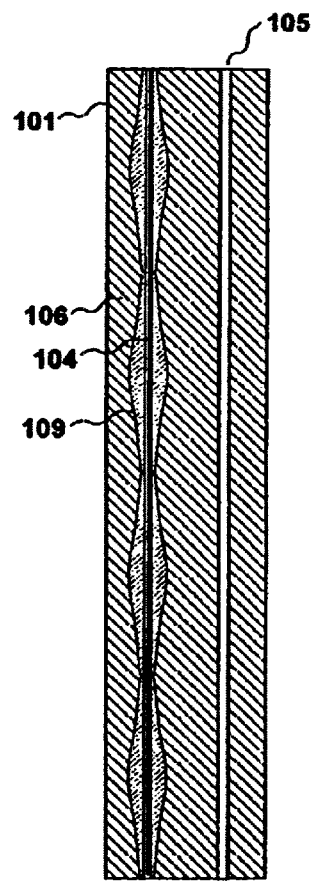
FIG. 9 shows a cross section axially across the borehole as depicted in FIG. 7.

In another preferred embodiment of the invention for detecting the location of displacement in soft material (weak rock/soil) utilizing OTDR is shown as a perspective drawing in FIG. 7 as well as a down borehole section, FIG. 8, and cross borehole section, FIG. 9. It is similar in most respects to the configuration for stiff soil and rock in terms of preferred borehole, test instrument and instrument configuration, and optical fiber choice remaining the same. Differences are however apparent in the downhole anchoring system.

Figure 10:
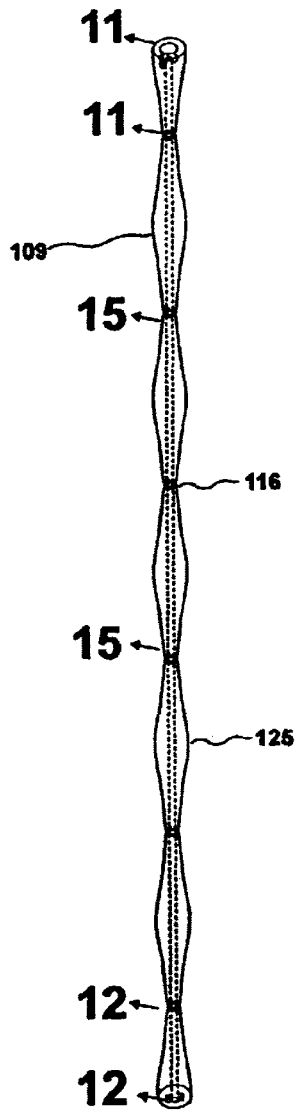
FIG. 10 depicts a segment of a connected anchor system of the invention with induced weak points between anchor segments.
Figure 15:
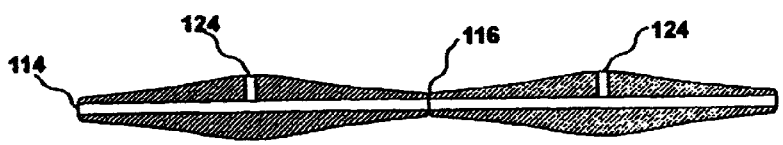
FIG. 15 depicts a cross section of connected anchors and the location and form of induced weak point between anchors of the invention.

For soft material (weak rock/soil), fiber optic sensor cable 104 is sheathed in a complete housing. This housing can be described as a sensor cable anchor with induced weak points and is referred to throughout the text as a sheathed anchor 109. The sheathed anchor 109 comprises a material that can be machined, cast, extruded, or otherwise formed into a shape and placed around a sensor cable 104 or cast in place around the cable in such a fashion as to localize displacement in the surrounding rock/soil mass to specific, discrete points along the sensor cable 104 length and the material of which the sheathed anchor 109 is fabricated is of sufficient stiffness and strength to promote sharp bending or cutting of the cable at the induced point of weakness upon rock/soil displacement. Alternatively, the sheathed anchor 109 may incorporate such a device of sufficient stiffness or design to cut, bend, or otherwise impinge on the sensor cable 104. The preferred configuration of the sheathed anchor 109 being shown in FIG. 10. It comprises a 1 inch diameter clear PVC rod about 36 inches long with a sensor cable channel 114 being drilled or machined along its long axis. The exterior of the rod is then shaped in opposing necked cones as shown in FIG. 15, with the length and spacing of these cones to be determined by rock/soil strength, rock/soil stiffness, and rock/soil failure mechanism.

Figure 11:
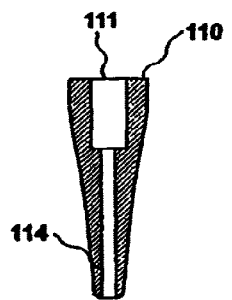
FIG. 11 depicts a cross section of the female connector for the anchor system shown in FIG. 10.
Figure 13:
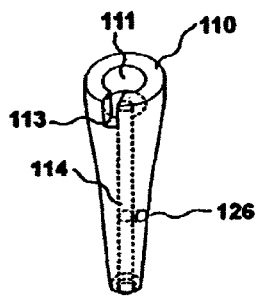
FIG. 13 depicts an isometric view of the female connector for the anchor system shown in FIG. 10.

Similarly, sheathed anchor 109 can be composed of discrete sections which may be coupled together to form a composite sheathed anchor of any length. A coupling is provided at each end of the individual section of the sheathed anchor 109. This coupling may be of any form, including slide, bayonet, ferrule, sleeve, hinge, etc, and may utilize the sheathing material, encapsulating agent, sensor cable, or added components as the coupling device. The preferred coupling system is composed of a male/female slide coupling system. The female coupling, FIG. 11 and FIG. 13, is constructed on one end of the shaped PVC rod by flattening the end to a plane perpendicular to the long axis of the PVC rod. This is a mating surface 110. A hole 111 is then drilled approximately one half the PVC rod diameter to a depth of one rod diameter plus about 0.375 inch into the end of the rod perpendicular to the mating surface, centered on the sensor cable channel 114. A slot 113 is then milled into the side of the female connector, of a width sufficient to allow the sensor cable 104 to pass, for a longitudinal depth along the rod axis of about 1 rod diameter plus about 0.375 inches.

Figure 12:
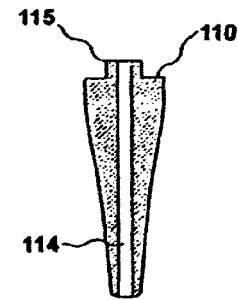
FIG. 12 depicts a cross section of the male connector for the anchor system shown in FIG. 10.
Figure 14:
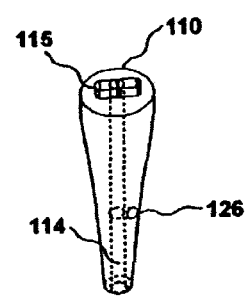
FIG. 14 depicts an isometric view of the male connector for the anchor system shown in FIG. 10.

The male coupling, FIG. 12 and FIG. 14, is constructed on the opposing end of the milled PVC rod relative to the female coupling. As for the female coupling, the end is flattened perpendicular to the long axis of the PVC rod and at right angles to the sensor cable channel 114. A male connector 115 is then milled out of the material on the end of the rod. This connector has a length at right angles to the sensor cable channel 114 identical to the diameter of the hole in the end of the female coupling (one half the PVC rod diameter). It should protrude above the mating surface about 0.25 to 0.375 inch. The ends of the male connector 115 that will contact the interior walls of the female portion of the coupler should be of a matching form, i.e. a circular arc of about one half the rod diameter.

Injection holes 124 perpendicular to the axis of the sensor cable channel 114 are then placed at the thickest portion of the opposing cones, or halfway between the strength reduced 116 necks. These holes are drilled to a depth of about one half of the rod diameter in order to intersect the interior channel and are later utilized to inject an encapsulating agent an/or adhesive around the sensor cable 104. Connector injection holes 126 are placed about ⅓ of the length of the connector bulb from the nearest strength reduction point 116.

A strength reduction 116 is effected at the thinnest diameter of the necked structure. This strength reduction may be accomplished by scoring, milling a slot, perforations, temperature treating, or other methods which reduces the strength and induce an area of weakness in this section of the sheathed anchor 109. The preferred method for effecting the strength reduction 109 is by milling a V notch channel to a depth that reduces the failure strength of the necked area to around 2 pounds in direct shear or about 3 pounds in bending. This is, however, dependent on rock/soil strength, stiffness, and failure mechanism.

A sensor cable 104 is then threaded through the sensor cable channel the entire length of the sheathed anchor. This sensor cable 104 can be held in place within the sheathed anchor 109 by physical or chemical means including, adhesive bonding between the sensor cable 104 and the sheathed anchor 109, diameter reduction of the sensor cable channel 114 by physical compression of the sheathed anchor, temperature shrinkage of the sheathed anchor 109 to effect clamping on the sensor cable 104, foam or other chemical additive injection into the sensor cable channel 114 that will effect adhesive or physical retaining forces on the sensor cable 104, mechanical means of anchorage including screw, bearing plate, spring, or other forms of physical impingement on the sensor cable 104, direct casting of the sheathed anchor or a fractional component around the sensor cable 104, incorporation of the sheathed anchor 109 by incorporation as an integral member of the sensor cable 104 jacket, etc. The preferred method utilizes standard or clear PVC adhesive that is injected with a syringe through the injection hole 124 into the annulus between the sensor cable 104 and the sheathed anchor 109. The clear nature of the PVC composing the sheathed anchor 109 allows observation of the injected adhesive to insure complete encapsulation of the sensor cable 104. Injection is stopped before the adhesive reaches the strength reduced 116 portion of the sheathing. The two half bulb sections containing the couplings are bonded to the sheathed anchor 109 only in the lower ⅓ of the coupling section removed from the strength reduction point 116 by injection of an adhesive through connector injection holes 126. This Leaves the sensor cable 104 unencapsulated by adhesive in the area of strength reduction 116. Alternatively the adhesive can encapsulate the sensor cable 104 the full length of the sheathed anchor 109, including the strength reduction point 116. Allowances for bending and shear strength of this adhesive then need be taken into consideration when determining the strength of the sheathed anchor 109 at the location of the strength reduction point 116.

In order to connect individual sections of the sheathed anchor 109, the sensor cable 104 is then threaded through sensor cable channel 114 of another section of sheathed anchor 109, and connected to the completed, bonded, section. This is a temporary connection and is for assemblage only. The permanent connection requires bonding of mating surfaces 110. The cable is pulled tight through the second sheathing unit and bonded as per the first completed section. Additional sheathed anchors 109 are added until the required length for borehole installation is attained.

After cure of the encapsulation adhesive, the individual sheathed anchor units 109 are separated and folded back along themselves with the sensor cable 104 being the connector.

Upon deployment in the field, prior to installation in the borehole 101, PVC adhesive is applied to the interior portion of the female connector 111 and mating surface 110 of the male and female connectors. The individual sheathed anchor 109 units are then joined at abutting connectors. This forms a single, welded monitoring unit with the primary weak points being the strength reduced 116 necks of the sheathed anchor 109.

If desired at this point, the sheathed anchor 109 can be completely broken at any or all of the strength reduced 116 portions of the completed sheathed anchor assemblage. Thus, each individual bulb of the sheathed anchor 109 becomes an individual anchorage sleeve 103. This configuration is therefore an end member of the type for use in rock/stiff soil. Such a configuration may be utilized in soft soils with relatively minor displacement causing loads where concerns are had as to development of breakage/displacement stress on the strength reduced 116 portion of the sheathed anchor 109.

The sensor cable 104 with the attached sheathed anchor units 109 is inserted into the borehole 101. A grout tube can be inserted into the borehole as well, but unlike for the stiff strong material (rock and strong soils) configuration, the grout tube is separated from the sheathed sensor cable, FIG. 8 and FIG. 9 if borehole 101 diameter allows. This is to minimize the impact of foreign bodies within the borehole 101 on stress distributions around the sheathed anchor 109 unit. If dimensions do not allow this configuration, the sheathed anchor units 109 may be affixed to the grout tube 105 to simplify installation. Optionally, grout 106 may be placed utilizing a retractable tremie line.

After insertion in the hole, the sensor cable should be OTDR tested to establish a baseline for the remainder of the installation process.

The grout tube 105 is then inserted into the borehole. This is preferably a commercial grout tube available for grouted cable bolts, but can be constructed from 1 inch PVC pipe with adequately connected couplings. Alternatively, the grout tube 105 can be utilized as an air bleeder line for upwards oriented holes, with the grout 106 being introduced at the borehole 101 collar.

Grout 106 is then placed into the borehole. The grout may be of any composition, including cementatious products, plastic resins, foam products, soil, sand, gravel, or simply collapse of material in which the borehole is drilled. However, the grout 106 utilized to backfill the borehole 101 should be of approximately the same stiffness (modulus) as the surrounding soils. The purpose is not only to completely fill the hole and encapsulate the sheathed anchor 109 assemblage but also to accomplish stress transfer to individual bulbs of the sheathed anchor 109. This stress transfer is the mechanism of yielding and breakage of the necked/scored portion of the sleeve and is thus critical to performance. If a pumpable grout is utilized, it should be placed until the material completely fills the hole and is extruded from the borehole collar. It is preferable to retract the grout tube 105 as the grout is being placed. It may also be removed immediately after grout placement, although this is less preferable. Leaving the grout tube 105 in the borehole 101, if the borehole is of insufficient diameter, may impact on the function of the monitoring system.

After grout 106 emplacement, the sensor cable 104 within the sheathed anchor 109 unit should be OTDR tested and compared to the baseline test.

As for all embodiments of the OTDR rock/soil displacement detection system, there should exist at least 80 feet of sensor cable 104 launch length free and unkinked on surface between the OTDR instrument 108 and the collar of the grout 106 filled borehole 101.

If the geologic material can be cut with a fluid jet (i.e. water jet action), it is possible to attach a fluid line with a nozzle to the sheathed anchor 109 unit. This can then be directly inserted into the soil without the use of a borehole 101 by fluid jet action in front of the advancing sheathed anchor 109 and sensor cable 104. The advantages of this system are that minimal intrusion is made in the soil mass, the cost of a borehole 101 is avoided, and the monitoring system is either encapsulated by surrounding soils and slurry or can be quickly encapsulated by utilizing the water jet line as a downhole grout tube 105, if required.

The OTDR system for detecting the location of displacement in soft material (weak rock/soil) is then ready for use. Monitoring can be conducted on a discrete basis by attaching and testing the fiber cable 104 at pre-determined or random time intervals. Alternatively, multiple sensor cable 104 assemblages can be patched through a switching device enabling continuous remote monitoring of a collection of the above monitoring devices.

Alternatively, an embodiment configured for TDR (time domain reflectometry) detection of the location of displacement in soft material (weak rock/soil) may utilize Belden model 8219 coaxial cable as sensor cable 104. A coaxial BNC connector replaces the FC/PC fiber optic connector, and a Tektronix Cablescout TV220 TDR test unit replaces the Wavetek MTS 5100 OTDR test instrument 108. The launch length of cable can he reduced to about 5 ft or less.

An embodiment of the invention suitable for all geologic conditions, but primarily intended for materials with properties similar to highly broken rock, decomposed rock, and soils utilizes principles which are a combination of the embodiments described above for stiff, strong soils. This embodiment utilizes fiber optic cable as sensor cable 104 as shown as a perspective drawing in FIG. 7 as well as a down borehole section, FIG. 8, and cross borehole section, FIG. 9. It is similar in most respects to the embodiment described above in terms of preferred borehole, test instrument and instrument configuration, and sensor cable choice remaining the same. Differences are however apparent in the construction of the anchoring system.

Figure 25:
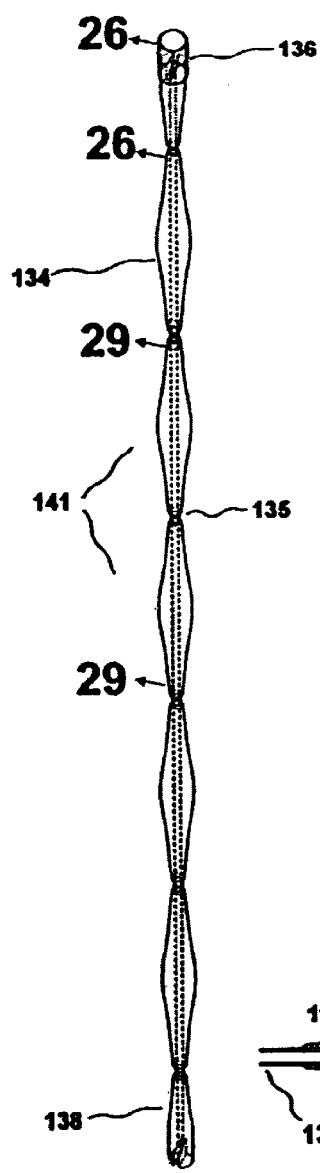
FIG. 25 depicts a segment of a composite anchor system of the invention with breakable links between the anchor segments.
Figure 26:
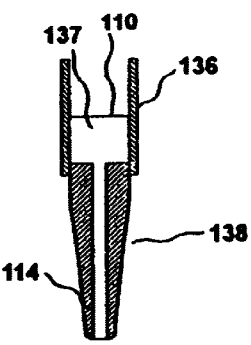
FIG. 26 depicts a cross section of the connector for use with the anchor system shown in FIG. 25.
Figure 27:
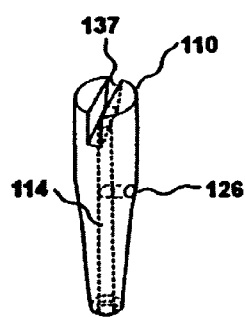
FIG. 27 depicts an isometric view of the connector for the anchor system shown in FIG. 25.
Figure 28:
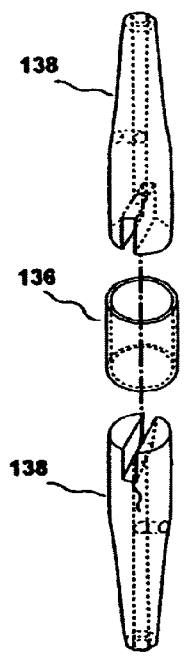
FIG. 28 depicts an isometric view of the connector system for the anchor system shown in FIG. 25.
Figure 29:
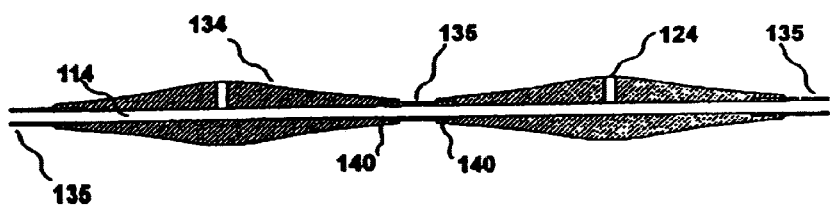
FIG. 29 depicts a cross section of connected anchors and breakable link between anchors of the invention.
Figure 30:
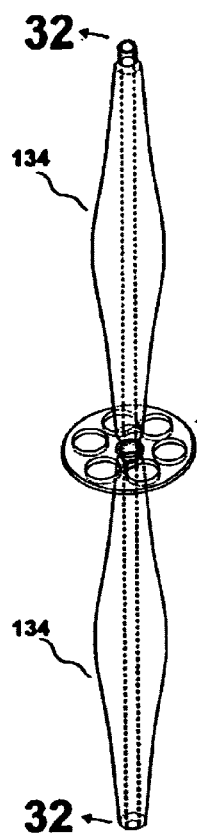
FIG. 30 illustrates an isometric view of a sensor cable motion restrictor of the invention between two shaped cable anchors.

The sensor cable 104 is sheathed in individual shaped anchors. Each shaped cable anchor 134 comprises a material that can be machined, cast, extruded, or otherwise formed into a shape and placed around, or incorporated in, a sensor cable 104 in such a fashion as to localize displacement in the surrounding rock/soil mass to specific, discrete points along the sensor cable 104 length. The material of which the shaped anchor 134 is fabricated is of sufficient stiffness and strength to promote sharp bending or cutting of the cable at the induced point of weakness upon rock/soil displacement. Alternatively, the shaped cable anchor 134 may incorporate such a device of sufficient stiffness or design to cut, bend, or otherwise impinge on the sensor cable 104. The preferred configuration of the shaped anchor 134 being shown in FIG. 25 thru FIG. 29. Although shaped cable anchor 134 can be of any shape (square, cylindrical, spheroidal, etc.), be composed of a rigid, semi-rigid, or plastic material, and physically attached to the sensor cable 104 by a variety of means including crimp, glue, heat shrink, welding, incorporation in fiber jacket, etc., the preferred configuration of the shaped cable anchor 134 is a clear PVC cylinder of about 1 inch diameter and about 6 inch length, FIGS. 25 thru 29. A sensor cable channel 114 is drilled or machined along its long axis. The exterior of the rod is then shaped in opposing necked cones as shown in FIG. 25, with the length and spacing of these double opposing cones to be determined by rock/soil strength, rock/soil stiffness, and rock/soil failure mechanism (i.e., rock/soil material properties).

These individual shaped cable anchors are then joined to form a composite anchor unit 141 similar to the sheathed anchor 109. These composite units form discrete sections which may be coupled together to form a composite anchor unit 141 of any length (FIG. 25). A coupling is provided at each end of the individual sections of the composite anchor unit 141. This coupling may be of any form, including slide, bayonet, ferrule, sleeve, hinge, etc., and may utilize the sheathing material, encapsulating agent, sensor cable, or added components as the coupling device. The preferred coupling system is composed of a sleeve cemented over two halves of a shaped anchor (FIG. 28), described here as a connector anchor segment 138. Although the connector anchor segment 138 can be of any shape (square, cylindrical, spheroidal, etc.), be composed of a rigid, semi-rigid, or plastic material, and physically attached to the sensor cable 104 by a variety of means including crimp, glue, heat shrink, welding, incorporation in fiber jacket, etc., the preferred configuration of the connector anchor segment 138 is a clear PVC cylinder of about 0.75 inch diameter and about 6 inch length, FIGS. 26 thru 27. It is then cut in half across the long axis of the sensor cable channel 114. This cross axis saw cut becomes the mating surface 110 for the two halves of the connector anchor segment 138. A slot is then formed at right angles across the mating surface to a depth of 1.2 times the shaped anchor 134 maximum radius with a width sufficient to allow sensor cable 104 passage. This becomes the sensor cable fold access slot 137. This allows completed sections of the composite anchor unit to be folded one next to the other. The connector sleeve 136 is a common 0.75 inch inside diameter schedule 40 PVC sleeve of approximately 1.5 inches length. Mating of the segments is accomplished, during assembly, by placing the sensor cable 104 through the shaped anchors 134, a connector anchor segment 138, the connector sleeve 136, another connector anchor segment 138, and then into the series of shaped anchors 134 forming a new composite unit 141.

Injection holes 124 perpendicular to the axis of the sensor cable channel 114 are then placed at the thickest portion of the opposing cones of the shaped cable anchors 134. These holes are drilled to a depth of about one half of the anchor diameter in order to intersect the interior channel and are later utilized to inject an encapsulating agent and/or adhesive around the sensor cable 104. Connector injection holes 126 are placed about midway between the mating surface and the end of the tapered cone of the connector segment such that they intersect the sensor cable channel 114. Adhesive is later placed in this hole to secure the sensor cable 104 in place.

The shaped cable anchors 134 are connected by an anchor connector 135. This allows the connected shaped cable anchors to act as a single rigid composite unit 141 for insertion into the borehole 101. These anchor connectors form a breakable link between the shaped anchors 134. They may be of any composition, such as glass, plastic, ceramic, metal, composite, or other, and of any shape such as circular, elliptical, square, or other. They may be hollow or solid, encapsulate the sensor cable 104, or be adjacent to it. They may be scored or weakened in some fashion as to reduce their strength and increase their susceptibility to a variety of failure modes. The purpose of the anchor connector 135 is to provide a rigid, breakable connection between the shaped anchors 134 that surrounds or is adjacent to the sensor cable 104. Upon deformation of the geologic mass in which the sensor cable 104 and shaped cable anchors 134 are inserted, the shaped cable anchors 134 will undergo rotation/translation. This will impart stress to the anchor connector 135. At some stress point, which may be pre-determined by engineering analysis, the anchor connector 135 will fail. At this point, the sensor cable 104 will begin to deform, either being cut or impinged upon by the broken edges of the newly failed anchor connector 135, and/or by continued translation/deformation of the shaped cable anchors 134.

If desired at this point, the composite anchor unit 141 can be completely broken at any or all of anchor connectors 135. Alternatively, the composite anchor may be produced without anchor connectors, with shaped anchors simply connected by the sensor cable 104. Thus, each individual bulb of the composite anchor 141 becomes an individual shaped anchor 134. This configuration is therefore an end member of the embodiments described above for stiff, strong soils. Such a configuration may be utilized in soft soils with relatively minor displacement causing loads where concerns are had as to development of breakage/displacement stress on the anchor connector 135 portion of the composite anchor 141.

The preferred configuration of the anchor connector is 4 to 5 mm inside diameter glass tube of approximately 1.3 inch length. The sensor cable channel 114 within the shaped anchor is re-drilled to the outside diameter of the glass anchor connector to a depth of about 0.3 inches 140 on both ends of the shaped anchor. The glass tube is then inserted into adjoining shaped anchors 134 or connector anchor segments 138. If desired, a quick setting adhesive can be applied to both ends of the glass tube prior to insertion into the shaped anchor. Alternatively, after insertion of the sensor cable 104, the assemblage is injected with polyurethane bonding cement that will also bind the glass tubing in place between the shaped anchors 134. One adhesive that worked well was 3M Scotch-Weld DP8005. A sensor cable 104 is then threaded through the sensor cable channel the entire length of the composite anchor system 141.

Immediately prior to insertion in the hole, the interior of the connector sleeve 136 and the mating areas of the connector segment 138 are treated with PVC adhesive. The two butt ends of the mating surfaces 110 are placed together and the connector sleeve 136 slid over the butt joint. Once sufficient cure has been allowed that the pieces will not separate, they may be inserted into the borehole. If the connector sleeve 136 is lost or broken, a new connector sleeve 136, may be installed by making a longitudinal cut down the axis of the replacement PVC sleeve. The width of this cut must be adjusted such that the sleeve can pass over the anchor connector 135 and associated portions of the shaped anchor 134. The new connector sleeve is then treated in the same fashion described for the connector sleeve 136 above. However, it will not have quite the strength as the unslotted assembly. The remainder of the assembly is as for the OTDR embodiment for relatively soft soils, described previously, substituting the composite anchor system 141 for sheathed anchor 109.

Figure 34:
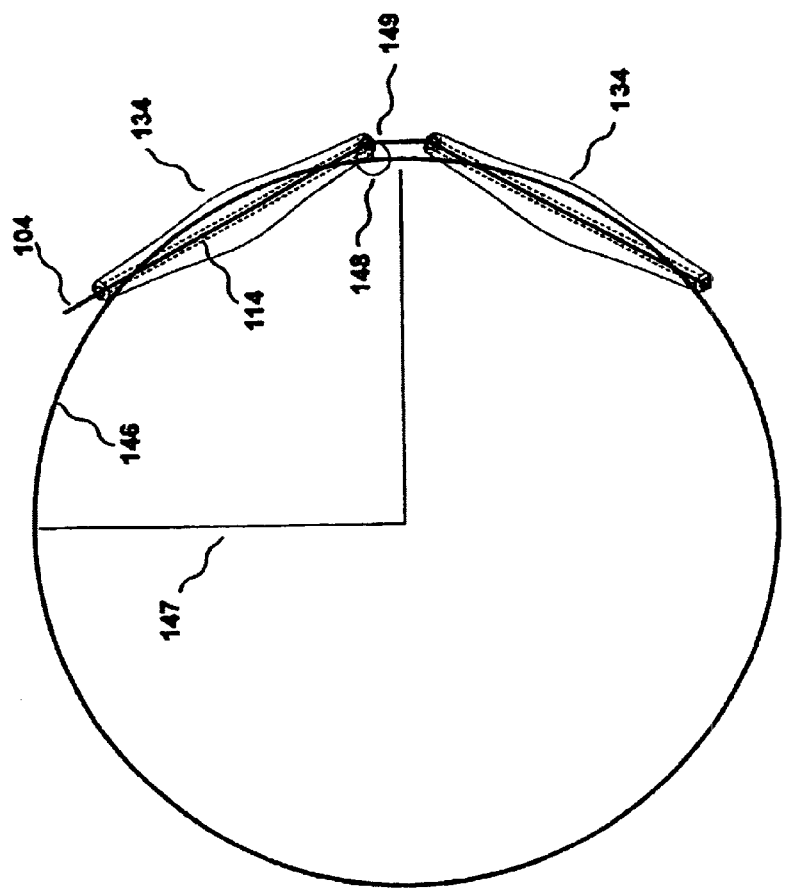
FIG. 34 illustrates the difference in sensor cable strain and bend radius between an unanchored sensor cable and a sensor cable acted on by shaped anchors.
Figure 33:
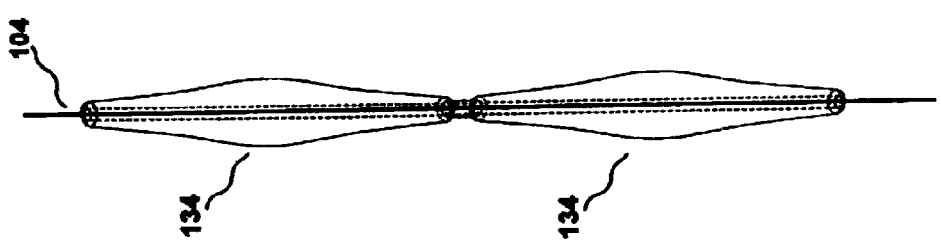
FIG. 33 depicts an isometric of two shaped anchors of the invention with a breakable connector between the anchor segments.

FIG. 33 and FIG. 34 demonstrate the concept of shaped anchor 134 induced displacement/moment amplification on the sensor cable 104 during deformation of the surrounding media. The shaped anchors 134 encapsulating the sensor cable 104 are initially aligned along a straight path, FIG. 33. Upon displacement of the encapsulating geologic media, or grout 106, the sensor cable assemblage is bent into a circular arc 146, FIG. 34.

The sensor cable 104 encapsulated within the shaped anchors 134 cannot undergo displacement, Therefore, the required displacement of the sensor cable assemblage, including anchors, to approximate the circular arc 146 described by the non-anchored cable, is restricted to the segment 149 of sensor cable 104 between the shaped anchors 134. Thus, the shaped anchors 134 induce an increase in sensor cable 104 tensile strain approximately 5 times that of the non-anchored cable. As tensile strain on the sensor cable 104 induces both detectable effects on the physical properties of the cable as well as potentially inducing breakage, the greater the induced strain, the better the instrument will function as an event detector.

In a similar fashion to that above, the bend radius 148 of the shaped anchor 134 induced deformation of the sensor cable 104 initially, dependent upon end conditions of the anchor, will be around 200 times smaller than that of the bend radius 147 of the non-anchored sensor cable 104. The tighter the bend radius, the greater the loss experienced by a signal traversing this bend, creating a greater disturbance in the TDR return signal and enhancing the probability of the event being detected. Once again, this is desirable in an event detector.

Figures 35, 35A, 35B, 35C:
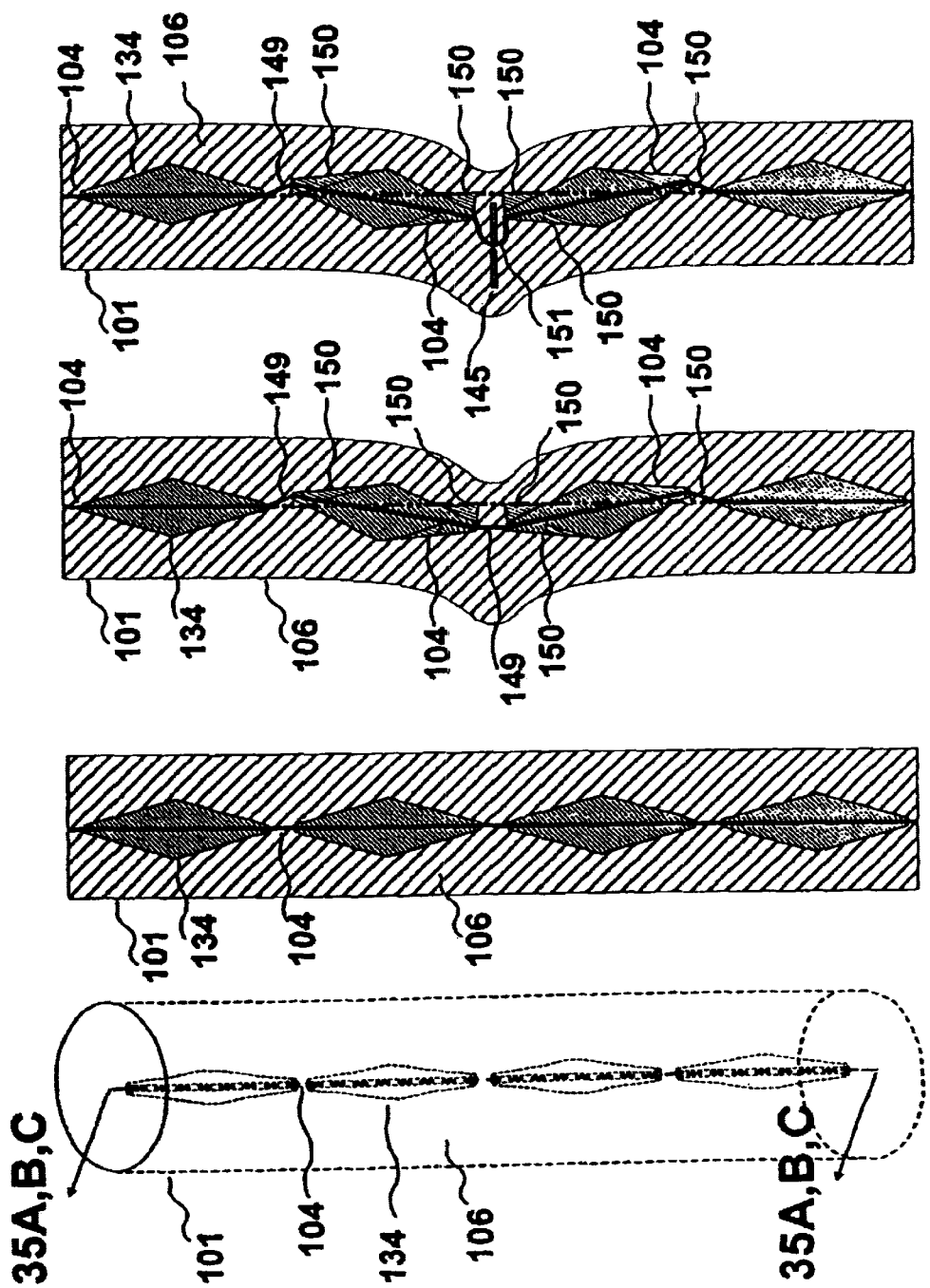
FIGS. 35 to 35C illustrate the amplifying effect of the shaped anchor on a sensor cable of the invention, grout crushing due to anchor rotation, and the effects of a cable motion restrictor given distributed displacement within a surrounding geologic host.

Shear displacement, will be magnified in a similar fashion, primarily through the increase in localized strain (linear displacement) between the shaped anchors 134 and decrease in bend radius at the cable/anchor end interface. For example, FIG. 35, FIG. 35A, and FIG. 35B depict the composite anchor system 141 prior to, and subsequent to, distributed ground motion. This would be seen as distributed shear by an unanchored cable system and would affect the cable by causing an increase in distributed tensile strain over the affected sensor cable 104 length. An anchored system, such as provided by the composite anchor system 141 will also detect shear displacement as an increase in cable strain, although only at the ends of the shaped anchors 134. A tensile strain of about 7% is noted for the unanchored cable whereas a tensile strain of about 13% is noted for the composite anchor system 141, essentially doubling the detectable strain. In addition, a substantial decrease is noted in the bend radius of the sensor cable 104 with the composite anchor system 141 as compared to the unanchored cable. If localized shear motion is analyzed, such as depicted in FIG. 36, FIG. 36A, and FIG. 36B, similar effects are noted. However, in this case, there is no appreciable increase in strain (both being about 30%) between the unanchored cable and composite anchor system 141 due to the orientation of the displacing plane. Note in both cases how the individual shaped anchors 134 rotate about their individual centroids, crushing the grout 106 at the ends of the shaped anchors 134.

Figure 31:
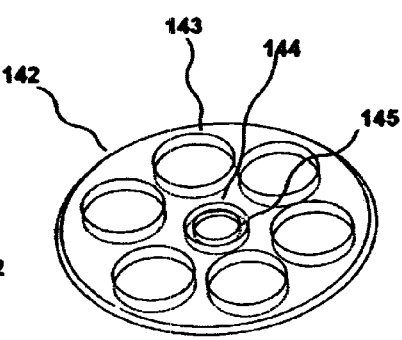
FIG. 31 is an isometric view of the cable motion restrictor of the invention.
Figure 32:
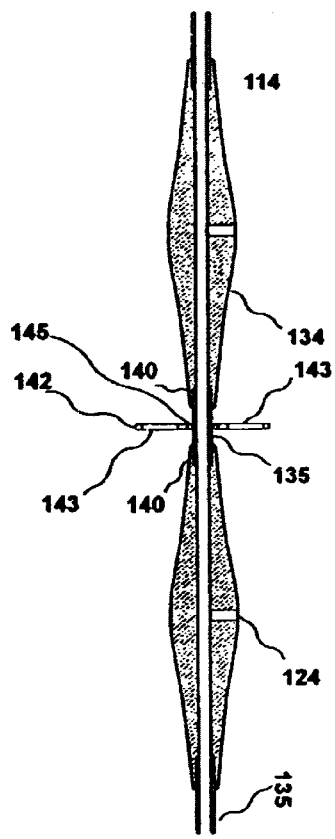
FIG. 32 is a cross section of FIG. 30, showing the cable motion restrictor and anchors in section.

The sensitivity of the composite anchor system 141 as well as the anchorage sleeve system 103 may be increased by the addition of a sensor cable motion restrictor 142 to the sensor cable at a location between the shaped cable anchors 134 as shown in FIGS. 31–32. The sensor cable motion restrictor is a device that, when encapsulated in the grout 106 or other material utilized to encapsulate the anchor system within the geologic mass, retards motion of the sensor cable 104. During ground deformation, as the shaped anchors 134 rotate around their individual centroids, they may tend to drag the sensor cable 104 through a low strength grout 106. If the exposed sensor cable 104 between the shaped anchors 134 is restricted from moving through the grout 106 column, the strain and bending motion of the sensor cable will be enhanced relative to the unrestricted case. This will result in a greater sensitivity of the monitoring system to ground disturbance and thus event detection. This is shown in FIG. 35C, for distributed strain, where the strain for an unanchored cable would be about 7%, for a composite anchor system around 13%, and for the composite anchor system 141 with a sensor cable motion restriction 142 being about 130%. This is a strain increase of 18 times over the unanchored cable, with a much smaller bend radius. FIG. 36C, for localized strain, shows a strain level of approximately 30% for the unanchored cable and composite anchor system 141, with a strain of about 40% for the composite anchor system 141 with sensor cable motion restrictor 142. This is an increase of about 25% in tensile strain over the unanchored cable alone, again indicating the increased detection capability of the anchored system.

While the sensor cable motion restrictor 142 may be formed in a variety of shapes (polygonal solids, elliptical solids, "spider-web" or net arrangements, rods, discs, etc.) and formed of a variety of materials (composites, plastics, glass, metal, ceramic, woods and organic substitutes, etc.), the preferred configuration is a two inch diameter PVC disc approximately 0.15" thick. A hole of 0.4 inch diameter hole 143 is drilled in the center of this disc at right angles to its thinnest dimension. A brass or steel sleeve of a similar thickness to the PVC disc thickness (0.15 inches), of 0.4 inch diameter, and with a inner diameter sufficient to allow passage of the anchor connector between anchors 135 or unsurrounded sensor cable 104 is bonded in the center hole 143 of the PVC disc. One adhesive that worked well was 3M Scotch-Weld DP8005. A total of six, 0.5 inch diameter holes 143 are drilled at right angles to the thinnest dimension of the PVC disc, with the center point of this hole halfway between the inner hole 143 and the outer edge of the PVC disc. These holes 143 are also spaced on 60 degree arc centers measured from the center of the disc such that the holes are spaced equally circumferentially as well.

Alternatively, a shaped anchor of minimal length and specific material properties may be designed to retard sensor cable motion in a fashion similar to that of the cable motion restrictor 142. In fact, the cable motion restrictor may be a shaped anchor. This specially designed anchor may be alternated between the displacement amplifying shaped anchors to generate the same effect on sensor cable 104 motion and deformation as the cable motion restrictor 142 depicted in the diagrams.

During assembly of the composite anchor 141 or anchorage sleeve system 103, the sensor cable motion restrictor 142 is placed around the sensor cable 104 or the anchor connector 135 and bonded. One adhesive that worked well was 3M Scotch-Weld DP8005. Multiple sensor cable motion restrictors 142 may be placed in any one zone along the cable so long as they do not interfere with shaped anchor 134 or anchorage sleeve 103 motion. The design of the sensor cable motion restrictor 142 is intended to be altered in shape and dimensions such that it function in a variety of encapsulating materials. For very weak soils, the dimensions of the sensor cable motion restrictor 142 must be increased such that the bearing area within the encapsulating material is sufficient to restrict motion of the sensor cable motion restrictor 142 assembly. Conversely, in stronger encapsulating materials, the dimensions of the sensor cable motion restrictor 142 can be substantially reduced.

As before, this embodiment may be configured for use with a TDR (time domain reflectometry) system for detecting the location of displacement. For example, a Belden model 8219 coaxial cable can be used for sensor cable 104 in the composite anchor system 141. Similarly, a coaxial BNC connector replaces the FC/PC fiber optic connector, and a Tektronix Cablescout TV220 TDR test unit replaces the Wavetek MTS 5100 OTDR test instrument 108. The launch length of cable can be reduced to about 5 ft or less.

Figure 16:
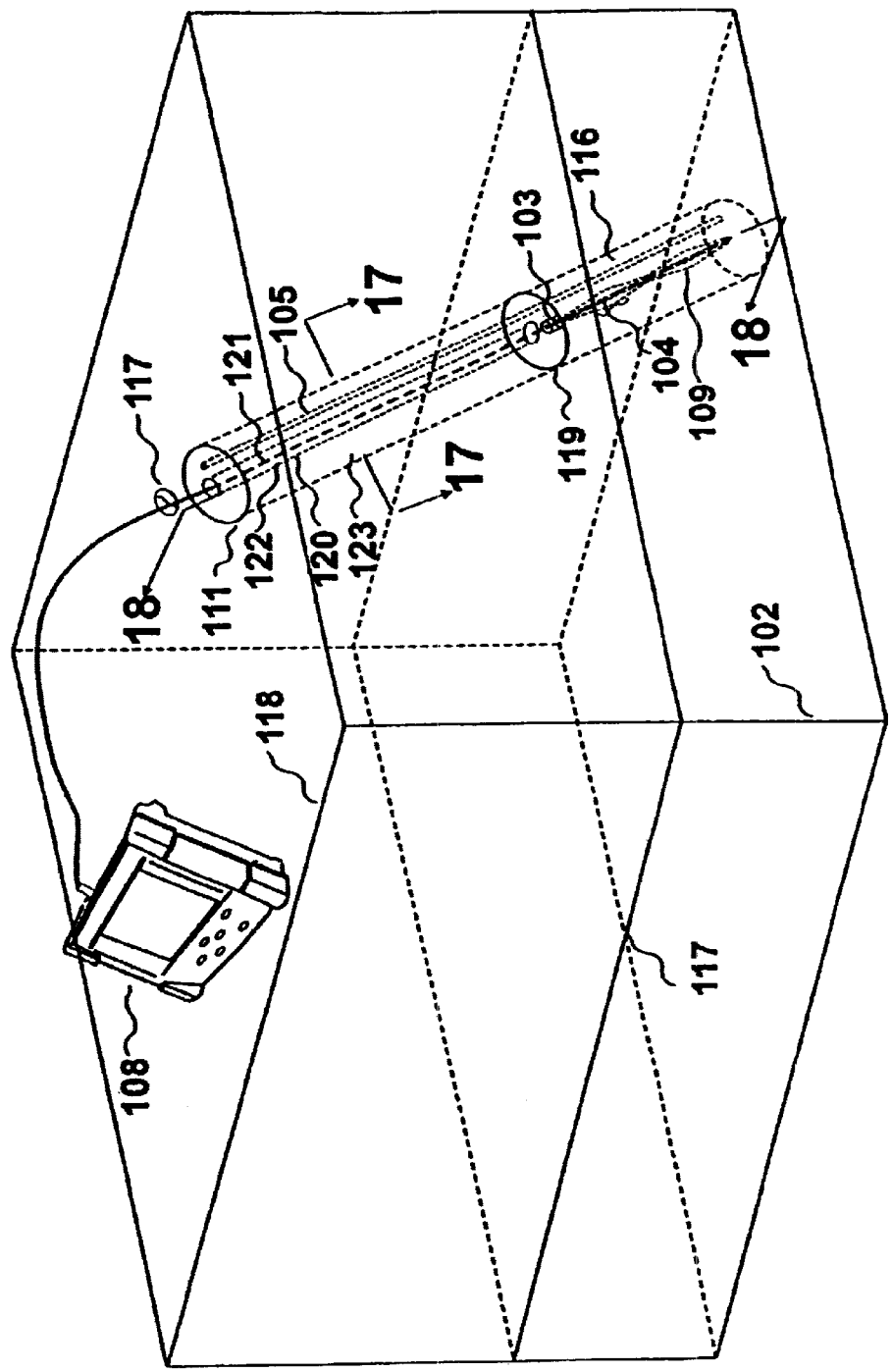
FIG. 16 shows the general configuration of the installed monitoring cable monitoring system of the invention such that monitoring may be conducted through an active geologic failure zone.
Figure 17:
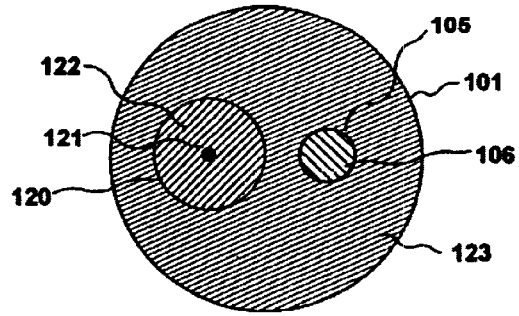
FIG. 17 shows a cross section diametrically across the borehole as depicted in FIG. 16.
Figure 18:
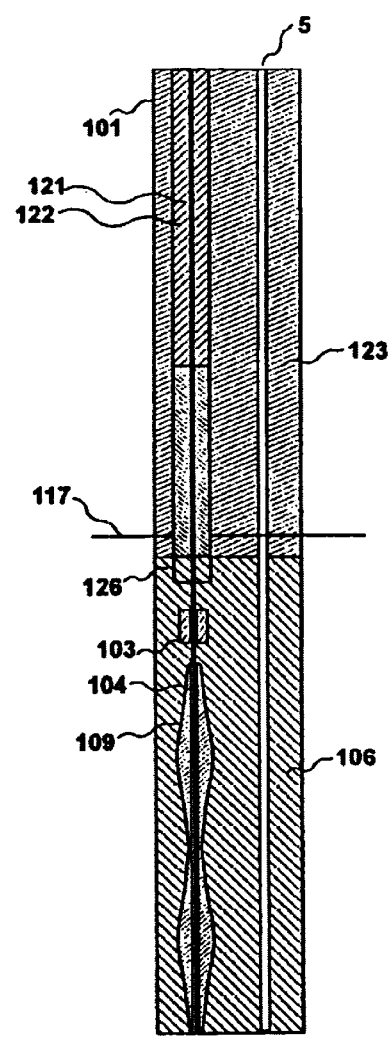
FIG. 18 shows a cross section axially across the borehole as depicted in FIG. 16.

In yet another embodiment of the invention, a device for detecting the location of displacement beneath active rock/soil failures utilizing sensor cable is shown as a perspective drawing in FIG. 16 as well as a down borehole section, FIG. 17, and cross borehole section, FIG. 18. It is similar in all respects to the configuration for stiff soil and rock in terms of borehole 101 and OTDR test instrument 108.

The sensor cable assembly for actively displacing rock and soil materials comprises an armored, reinforced, high strength sensor cable 121 on the surface and to a depth within the borehole 101 either above or slightly below the expected failure plane 117. This armored sensor cable 121 is then either stripped of armoring, exposing the jacketed conducting elements within or, alternatively, fitted with a connector which can be coupled to unarmored sensor cable 104. The unarmored sensor cable 104 extends the remaining depth of the zone to be monitored. An example of armored fiber optic cable functioning as armored sensor cable 121 which has provided reasonable results is Chromatic Technologies 750 Series cable, 8.3/125 single mode. 2 fiber, PVC jacketed, terminated on the one end to be connected to the OTDR measuring instrument 108 with an FC/PC fiber optic connector. The down hole end of the armored cable 121 is either equipped with a connector to attach to non-reinforced sensor cable 104, an example of which is Commscope optical cable, fiber optic riser, 8.3/125 single mode, 2 fiber, 2.9 mm fiber optic cable, PVC jacketed. This sensor cable 104, must also be equipped with a connector on the upper end to affix to the armored sensor cable 121. As mentioned above, the armor and reinforcement may be stripped from the jacketed interior cable and discarded, resulting in individual jacketed cable which may be utilized for OTDR monitoring. The case where jacketed optical fiber is stripped from the armored sensor cable 121 has advantages over the configuration where sensor cable 104 is connected to the armored cable 121 in that it is more sensitive to bending and has no event dead zone as a function of a connector.

Anchorage sleeves 103, sheathed anchors 109. or composite anchor units 141 may be attached to the unarmored portion of the sensor cable assemblage using previously discussed embodiments. These are utilized to monitor displacement immediately above, at the base of, or below, the base of the active failure zone 117.

A tube 120 composed of a rigid, semi-rigid, or plastic material, preferably being lightweight, ductile, having a low coefficient of friction, and having sufficient strength to withstand the rigors of installation and ground loads during installation is installed in borehole 101. The preferred configuration of this tube 120, FIG. 19, is 3 inch diameter schedule 80 PVC pipe. The tube 120 is inserted to the required depth in the borehole 101 taking care that it does not extend down into the monitoring zone. The armored sensor cable 122, with sufficient cable length at the borehole 101 collar to attach a connector or to allow 80 ft. of launch length, is attached by a coupler to the sensor cable 104 and sensor anchor system (anchorage sleeves 103, sheathed anchors 109, or composite anchor units 141). This assembled unit is then attached to a stiff tremie line and passed through the inside of tube 120 installed in borehole 101 until the bottom of the hole, or the specific monitoring depth is reached. Grout 106 of specifically designed properties is then placed through the tremie line, as the tremie line is withdrawn upwards, around the sensor assemblage. The tremie line should be retracted to a point slightly above (about 4 times the borehole 101 diameter) the connector between the sensor cable 104 and the armored cable 121, with the grout 106 designed to encapsulate the sensor cable assemblage being placed to this point. The grout 106 in the borehole should be slightly inside the tube 120 (about 1 hole diameter). Grout 106 injection is then stopped and a stiff bentonite seal placed in the hole for about 10 hole diameters above the previously placed grout. This may be done by feeding bentonite pellets down the tremie line. This serves as a low friction plug preventing the materials being placed in the tube 120 above this point from escaping downward and out into the failure mass.

The tube 120 is then filled with a liquid, semi-liquid, or deformable solid with an extremely low coefficient of friction. This low friction filler 122 within the tube 120 surrounding the armored sensor cable 121 assists in shielding the armored sensor cable 121 from point load and shear stresses. Its primary purpose is to provide an environment conducive to translation of the armored sensor cable 121 as deformation occurs within the failing rock/soil mass and thus within the tube 120. This will assist in prolonging the onset of failure of the armored sensor cable, increasing the life of the sensor cable monitoring system. This low friction filler may be organic or inorganic in nature. The preferred mode of placement is through the tremie line after placement of the bentonite plug at the bottom end of the large diameter tube 120. At this point, the preferred low friction filler 122 is a bentonite slurry mixed on surface and pumped down the tremie line. Alternatively, the inner surface of the tube 120 may be treated with a low friction compound (such as Teflon, silicone lubricants, etc.) to reduce friction between the tube 120 and the armored sensor cable 121 during motion of the active failure zone.

After low friction filler 122 placement, an OTDR test is then run to obtain baseline data for monitoring. The OTDR system for detecting the location of displacement under and within displacing rock and soil masses is then ready for use. Monitoring can be conducted on a discrete basis by attaching and testing armored fiber optic 121 at pre-determined or random time intervals. Alternatively, multiple sensor cable 104 and/or armored sensor cable 121 assemblages can be patched through a fiber optic switch enabling continuous remote monitoring of a collection of the above monitoring devices.

Again, this embodiment can be configured as a TDR (time domain reflectometry) system for detecting the location of displacement in active rock/soil failures. For example, Belden model 8219 coaxial cable can be used as sensor cable 104 and Belden model 8214 coaxial cable as the armored sensor cable 121. A coaxial connector is required between the two different cable types. A coaxial BNC connector replaces the FC/PC fiber optic connector, and a Tektronix Cablescout TV220 TDR test unit replaces the Wavetek MTS 5100 OTDR test instrument 108. The launch length of cable can be reduced somewhat in length relative to the 80 ft. recommended for an OTDR application. Sufficient length must be allowed to allow some cable retraction into the borehole 101 as a function of rock/soil deformation.

The operation of the OTDR embodiments for monitoring rock and strong soil, stiff-strong material, and for weak rock/soil, soft material, is as follows.

The OTDR test instrument 108 is switched on and allowed to reach an operating state. Any selectable parameters that must be set regarding instrument operations, such as those regarding fiber type, wavelength of source, test pulse length, etc. as described in the description of the method heretofore must be set at this point. The sensor cable 104, in this case composed of fiber optic material, is attached to the appropriate laser source of the OTDR test instrument 108. An optical time domain reflectometry (OTDR) test is then run. This comprises transmitting a laser pulse of fixed characteristics from the instrument end 130 of the optical fiber 129 to the downhole end of the optical fiber 131. If the optical fiber 129 is perfectly straight, shown in FIG. 22, the only loss of laser light will be that due to physical imperfections and physical limitations inherent to the optical fiber 129. If the optical fiber 129 deviates from a straight line, shown in FIG. 23, some light from the laser pulse is lost negotiating this change of direction. Appreciable laser light losses are noted at sharp bends 132. Reflections of laser light are seen from connections and fiber ends 133, as shown in FIG. 24. The OTDR instrument accumulates and averages the light loss for points along the length of the optical fiber 128. This averaging process must be allowed to continue for the period of time required to accumulate data for sufficient accuracy to allow detailed trace comparisons. The resulting signal trace is presented as signal strength in decibels vs. distance along the optical fiber. All tests for comparison of a OTDR signal trace of a specific fiber should utilize the identical set physical parameters for the OTDR test input (duration, frequency, pulse length, etc., as described heretofore.)

This acquired trace is then compared to the baseline trace that was conducted immediately after final installation for the specific optical fiber 128. This comparison may be conducted visually either by overlaying the signal traces from the baseline and present monitoring case, by subtracting the baseline trace from the present monitoring trace and plotting the decibel difference vs. signal length, or by calculating decibel loss per unit distance (the slope of the decibel vs. distance trace) for each trace and then plotting the resulting curve along the length of the optical fiber. The latter requires utilizing an incremental distance along the cable length for calculating the slope. As such, it requires care in use such that masking of the events does not occur. In all of the above cases, if a change is noted between the present monitoring trace and the baseline trace, an event has occurred affecting the optical fiber's 129 transmission. A change on the order of a 0.01 and 3 decibels is likely a kink, bend or offset of the cable. If this occurs within the portion of the sensor cable 104 grouted within the hole, it can be inferred that displacement is occurring within the geologic mass at the indicated depth from surface down the borehole 101. A large spike on the trace will always be noted at the distance along the trace corresponding to the total length of the optical fiber being tested. If this shifts and occurs closer to the borehole 101 collar than was noted on the baseline trace, it can be inferred that the optical fiber has been sheared, at that distance along the fiber optic cable 104. Multiple optical fibers within a fiber optic cable 104 provide redundancy and a means of confirming both fiber offset and fiber shear locations down the borehole 101.

An approximate TDR analog can be obtained from the aforementioned discussion by substituting electrical signal for laser pulse, electrical signal for laser, coaxial cable for optical fiber and optical fiber, and TDR for OTDR within the discussion above. One of skill in the art can readily adjust the parameters as TDR input signal characteristics will differ from light input signals. In general, changes in cable properties induced by changes in length and diameter of the coaxial cable can be detected with a TDR system.

The operation of the OTDR device for monitoring rock and soil displacement for the embodiment as described for locating displacement beneath active rock/soil failures is described here. It is similar to the above discussion with the following exceptions.

Sufficient armored sensor cable 121 should be located near the collar of the borehole 101 in such a fashion that as the failing rock/soil masses displaces that the armored sensor cable can be drawn down the tube 120.

Signal trace interpretation may be complicated by bends within the armored sensor cable 121. Multiple bends within the armored sensor cable, especially near the failure plane 117, may result in a zone of reduced accuracy downhole from the area of bending. Any coupler downhole to connect the armored sensor cable 121 with the standard sensor cable 104 will result in a signal dead zone. This is a function of the pulse length and resolution of the measuring TDR or OTDR instrument 108, and should be considered when designing and monitoring such systems.

An approximate TDR analog can be obtained from the aforementioned discussion by substituting electrical signal for laser pulse, electrical signal for laser, coaxial cable for optical fiber, optical fiber, armored fiber optic cable and TDR for OTDR within the discussion above. TDR input signal characteristics will differ from light input signals and must be adjusted accordingly.

In summary, the sensor cable systems of the invention is an improvement upon the art of TDR displacement monitoring. The system, therefore:

(a) utilizes a sensor cable capable of detecting motion utilizing any of the standard time domain reflectometry systems presently available, allowing selection of the most appropriate TDR method for the specific mode of deformation expected within the geologic mass;

(b) acts three-dimensionally and internally within the geologic mass to be examined;

(c) provides a geotechnical monitoring device utilizing TDR principles functioning as an event detector independent of the shape the cable assumes upon deformation of both itself and surrounding media as well as being independent of the stress type (shear, tensile, or compression) the sensing cable experiences during deformation of both itself and surrounding media;

(d) is capable of event detection along the sensor cable's design encapsulated length such that deformation in the surrounding geologic medium may be located proximal to the cable disturbance between anchors;

(e) incorporates a cable anchor that, when displaced, acts as a displacement amplifier, undergoing translation/rotation within the encapsulating grout or soil column so that stress and displacement acting on the anchors are transferred to the sensor cable between the anchors, significantly magnifying the disturbance event and providing a discrete point location within the sensor cable proximal to the disturbing event creating a much stronger detection signal, and thus likelihood of detection, as compared to an unanchored cable;

(f) utilizes a cable anchor sufficiently rigid and strong such as promote bearing failure in the encapsulating material upon translation/rotation by geologic material displacement, if such behavior is desired, that can be engineered as to length, shape, and material properties such as to specifically determine at what loads and deflections bearing failure will take place in the encapsulating medium as a function of cable anchor rotation;

(g) allows the sensor cable strength and modulus to be chosen to impact on the relative motion of the adjacent cable anchors so that cable strength can be low, allowing complete independence of adjacent anchor motion, to very high, allowing a tethering effect between the anchors;

(h) allows the material properties of the encapsulating agent to be chosen to determine the stress levels of bearing failure around the cable anchor upon geologic material displacement;

(i) allows for the provision of a tethering device to be applied to the sensor cable between moment and displacement amplifying anchors in such a manner as to further enhance sensitivity to geologic displacement of the event system, essentially providing an anchor of differing shape that restricts cable motion within the encapsulating grout or soil;

(j) allows for the installation of a geotechnical monitoring system by utilization of fluid jet action; and (k) can be modified to provide access through an actively failing and displacing geologic body such that a sensor cable can be placed and utilized for monitoring at and below the assumed failure mass's base plane.

Although the description provided within the document above is very specific regarding composition and details of the monitoring system, this should not be construed as limiting the scope of the invention, it merely provides illustrations, for disclosure purposes, on how the invention may be constructed for some of the presently preferred embodiments. For example, the shaped anchors may be composed of metal or ceramic, the sensor cable may be composed of a ceramic material for sonar TDR purposes; the tube allowing armored cable slippage for monitoring through a moving geologic mass may be pre-constructed onto the cable prior to insertion in the hole, etc. Thus the scope of the invention should be determined by the appended claims and their legal equivalents together with the examples given.

What is claimed is:

1. A sensor cable system for time domain reflectometry measurement of displacement in a geotechnical material comprising a sensor cable and an anchor attached to the cable, wherein the anchor is configured to be secured within the geotechnical material.

2. The sensor cable system of claim 1, wherein the anchor is secured to a grout tube.

3. The sensor cable system of claim 1, wherein the sensor cable comprises optical fiber configured for use with optical time domain reflectometry.

4. The sensor cable system of claim 1, wherein the sensor cable comprises sound transmission material configured for use with sonar time domain reflectometry.

5. The sensor cable system of claim 1, wherein a portion of the sensor cable is disposed within a borehole in the geotechnical material.

6. The sensor cable system of claim 5, wherein a portion of the borehole is filled with grout to secure the anchor within the geotechnical material.

7. The sensor cable system of claim 1, wherein the sensor cable further comprises an armored portion.

8. The sensor cable system of claim 7, wherein the sensor cable is disposed within a borehole in the geotechnical material and wherein the armored portion of the sensor cable extends to an area in the geotechnical material adjacent an expected failure plane.

9. The sensor cable system of claim 1, wherein the sensor cable comprises coaxial cable configured for use with electrical time domain reflectometry.

10. The sensor cable system of claim 9, wherein the sensor cable comprises a working length of at least about 5 feet.

11. The sensor cable system of claim 1, wherein the anchor extends along a substantial portion of the sensor cable.

12. The sensor cable system of claim 11, wherein the anchor further comprises an induced weak point.

13. The sensor cable system of claim 12, wherein the anchor is shaped to induce the weak point.

14. The sensor cable system of claim 12, further comprising a plurality of induced weak points.

15. The sensor cable system of claim 14, wherein the configuration of weak points increases a time domain reflectometry signal caused by displacement of the geotechnical material compared to a signal the displacement would generate in the sensor cable alone.

16. The sensor cable system of claim 14, wherein a segment of the anchor defined by adjacent induced weak points comprises a cable motion restrictor.

17. The sensor cable system of claim 14, wherein the sensor cable is disposed within a borehole in the geotechnical material and the anchor is secured within the geotechnical material by grout.

18. The sensor cable system of claim 14, wherein the anchor is broken at one of the induced weak points prior to insertion in a borehole in the geotechnical material.

19. The sensor cable system of claim 1, further comprising a plurality of anchors.

20. The sensor cable system of claim 19, wherein at least one of the anchors affects the sensor cable so that a time domain reflectometry signal is generated when energy is transmitted within the sensor cable.

21. The sensor cable system of claim 19, further comprising a time domain reflectometry signal attenuator disposed along said sensor cable.

22. The sensor cable system of claim 19, wherein the sensor cable has a diameter about 10% of the distance between the anchors.

23. The sensor cable system of claim 19, wherein the anchors are joined together by breakable connectors.

24. The sensor cable system of claim 23, wherein the anchors are shaped to increase a time domain reflectometry signal caused by displacement of the geotechnical material compared to a signal the displacement would generate in the sensor cable alone.

25. The sensor cable system of claim 23, wherein one of the breakable connectors is broken prior to insertion of the sensor cable in a borehole in the geotechnical material.

26. The sensor cable system of claim 23, further comprising a cable motion restrictor located between adjacent anchors.

27. The sensor cable system of claim 23, wherein the sensor cable is disposed within a borehole in the geotechnical material and the anchors are secured within the geotechnical material by grout.

28. A method for measuring displacement in a geotechnical material comprising the steps of:
   a) creating a borehole in the geotechnical material;
   b) providing a sensor cable system comprising a sensor cable and an anchor attached to the cable, wherein the anchor is configured to be secured within the geotechnical material;
   c) disposing the sensor cable within the borehole;
   d) depositing grout within the borehole to secure the anchor; and
   e) performing time domain reflectometry to monitor displacement within the geotechnical material.

29. The method of claim 28, wherein the step of performing time domain reflectometry determines the distance to the displacement.

30. The method of claim 28 comprising monitoring for displacement at random intervals.

31. The method of claim 28 comprising monitoring for displacement at pre-determined intervals.

32. The method of claim 28, further comprising the step of providing the anchor with induced weak points to increase a time domain reflectometry signal generated by displacement of the geotechnical material.

33. The method of claim 28, further comprising the step of providing a plurality of shaped anchors to increase a time domain reflectometry signal generated by displacement of the geotechnical material.

34. The method of claim 28, further comprising the step of providing a plurality of anchors joined by breakable connectors to increase a time domain reflectometry signal generated by displacement of the geotechnical material.

35. The method of claim 28, further comprising the step of providing the sensor cable with a cable motion restrictor to increase a time domain reflectometry signal generated by displacement of the geotechnical material.

36. The method of claim 28, further comprising disposing multiple sensor cables within the borehole.

37. The method of claim 36 comprising monitoring the multiple sensor cables for displacement continuously.

38. A sensor cable system for time domain reflectometry measurement of displacement in a geotechnical material comprising a sensor cable and an anchor attached to the cable, wherein the anchor is configured to be secured within the geotechnical material, and wherein said anchor impacts motion in a perpendicular direction of the cable.

39. A method for measuring displacement in a geotechnical material comprising the steps of:
   a) creating a borehole in the geotechnical material;
   b) providing a sensor cable system comprising a sensor cable and an anchor attached to the cable, wherein the anchor is configured to be secured within the geotechnical material;
   c) disposing the sensor cable within the borehole;
   d) depositing grout within the borehole to secure the anchor; and
   e) performing time domain reflectometry to monitor displacement within the geotechnical material,
   f) wherein said anchor promotes or retards motion in a perpendicular direction of the cable.

* * * * *